United States Patent [19]
Weder et al.

[11] Patent Number: 5,481,850
[45] Date of Patent: Jan. 9, 1996

[54] ROTARY COVERING AND FASTENING SYSTEM

[75] Inventors: Donald E. Weder, Highland; William F. Straeter, Breese; Joseph G. Straeter, Highland, all of Ill.; Paul Fantz, Imperial, Mo.; James G. Carmody, Highland; M. James Leider, Deerfield, both of Ill.

[73] Assignee: Highland Supply Corporation, Highland, Ill.

[21] Appl. No.: 88,692

[22] Filed: Jul. 7, 1993

Related U.S. Application Data

[63] Continuation-in-part of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned.

[51] Int. Cl.$^6$ .......................... B65B 11/00; B65B 51/08
[52] U.S. Cl. .................... 53/397; 53/414; 53/415; 53/580; 53/138.6
[58] Field of Search .................. 53/397, 464, 221, 53/225, 339, 580, 414, 415, 138.6; 493/167, 168, 386, 389

[56] References Cited

U.S. PATENT DOCUMENTS

| | | | |
|---|---|---|---|
| D. 295,525 | 5/1988 | Sakaki et al. | D15/145 |
| 1,994,962 | 3/1935 | Rushfeldt | 206/423 X |
| 2,133,278 | 10/1938 | Brodgen | 93/6 |
| 2,274,526 | 2/1942 | Bunn | 100/31 |
| 2,774,187 | 12/1956 | Smithers | 206/423 X |
| 2,882,660 | 4/1959 | Denton | 53/135 |
| 3,015,916 | 1/1962 | Denton | 53/3 |
| 3,186,333 | 6/1965 | Hoffman et al. | 100/9 |
| 3,318,230 | 5/1967 | Hilton | 100/4 |
| 3,849,972 | 11/1974 | Pepmeier et al. | 53/221 X |
| 3,965,655 | 6/1976 | Schooler et al. | 53/225 |
| 3,974,762 | 8/1976 | Kita et al. | 100/9 |
| 4,054,160 | 10/1977 | Knudsen | 140/93 |
| 4,086,117 | 4/1978 | Pearsall | 156/212 |
| 4,362,096 | 12/1982 | Hanscom | 100/10 |
| 4,401,020 | 8/1983 | Brux | 100/7 |
| 4,525,983 | 7/1985 | Libow | 53/221 X |
| 4,570,415 | 2/1986 | Centeno | 53/599 |
| 4,711,071 | 12/1987 | Kagi | 53/589 |
| 4,733,521 | 3/1988 | Weder et al. | 53/580 |
| 4,773,182 | 9/1988 | Weder et al. | 47/72 |
| 4,835,834 | 1/1989 | Weder | 29/525 |
| 5,077,937 | 1/1992 | Weder et al. | 47/72 |
| 5,111,638 | 5/1992 | Weder | 53/397 |
| 5,129,182 | 7/1992 | Weder | 47/72 |
| 5,231,794 | 8/1993 | Weder et al. | 47/72 |

FOREIGN PATENT DOCUMENTS 404142206  5/1992  Japan .................. 53/136.3

OTHER PUBLICATIONS

Exhibit A—Rubber Band Technology Ltd., Yakima, Wash., BandMaster 102 model AF. Form RBT 9–88.
Exhibit B—Rubber Band Technology, Ltd., Yakima, Wash., BandMaster 102 model ET. Form RBT 10–88.

(List continued on next page.)

Primary Examiner—Linda Johnson
Attorney, Agent, or Firm—Dunlap Codding

[57] ABSTRACT

An apparatus and method for forming a cover about an article and for fastening the cover to the article, and optionally for placing a label on the covered article. The article may be an article such as a potted plant and the cover may be a decorative cover. The apparatus comprises a rotatable platform having at least one opening sized to receive the article. At least portions of a sheet of material are supported in a position generally over the opening. A cover forming assembly having contacting portions for contacting the sheet of material is disposed in the opening in the support surface. The apparatus also comprises a tying device for automatically applying a band or fastener about a portion of the outer surface of the covered article for fastening the cover about the article when the platform is rotated into a fastening position.

19 Claims, 15 Drawing Sheets

OTHER PUBLICATIONS

Exhibit C—Strapack Inc., Tokyo, Japan, Sivaron S–661 & 661Y. Copyright 1984 Strapack Corp.

Exhibit D—Strapack Inc., Tokyo, Japan, StraPack Semiautomatic Strapping Machine S–660. Copyright 1988 Strapack Corp.

Exhibit F—Cyklop Strapping Corp., Downingtown, Pa., Cyklop EM–15 (two pages). Copyright 1987, Cyklop Strapping Corporation.

Exhibit H—Cyklop Strapping Corp., Downingtown, Pa., ASM Series (two pages). Copyright 1988 Cyklop Strapping Corporation.

Exhibit S—B. H. Bunn Company, Lakeland, Fla., Bunn Models 1691, 1991, 2091, 2491, and 3091 Tying Machines brochure, Copyright 1992 (three pages).

Exhibit V—Clements Industries, Inc., South Hackensack, N.J., Tach–It Twisters, Packaging Machines... Big Openers ... Tape Winders ... Bundlers advertisement (one page, 1986).

Exhibit W—Clements Industries, Inc., South Hackensack, N.J., Tach–It Twisters, Model 3558 advertisement (one page, 1986).

Exhibit Y—InterPower Packaging, Hodgkins, Ill., Power 260 brochure (two pages, 1991).

Exhibit Z—The John Henry Company, Cellocoup Brochure, copyright 1992 (four pages).

Exhibit DD—Felins, Inc., Milwaukee, Wis., Pak–Tyer 2000 brochure (four pages, 1991).

Exhibit EE—"Color Them Happy With Highlander Products", ©1992, 2 pages.

Exhibit FF—"Super Seller", Supermarket Floral, Sep. 15, 1992.

Exhibit GG—"Costa Keeps The Christmas Spirit", Supermarket, Sep. 15, 1992.

Exhibit HH—"Now, More Than Ever", Supermarket Floral, Sep. 15, 1992.

Exhibit II—"Halloween", Link Magazine, Sep. 1992, 2 pages.

Exhibit JJ—Speed Cover® Brochure, "The Simple Solution For Those Peak Volume Periods", Highland Supply Speed Cover® Brochure, ©1989, 6 pages.

Exhibit KK—"Speed Sheets® And Speed Rolls", Highland Supply Speed Sheets® Brochure, 1990©, 2 pages.

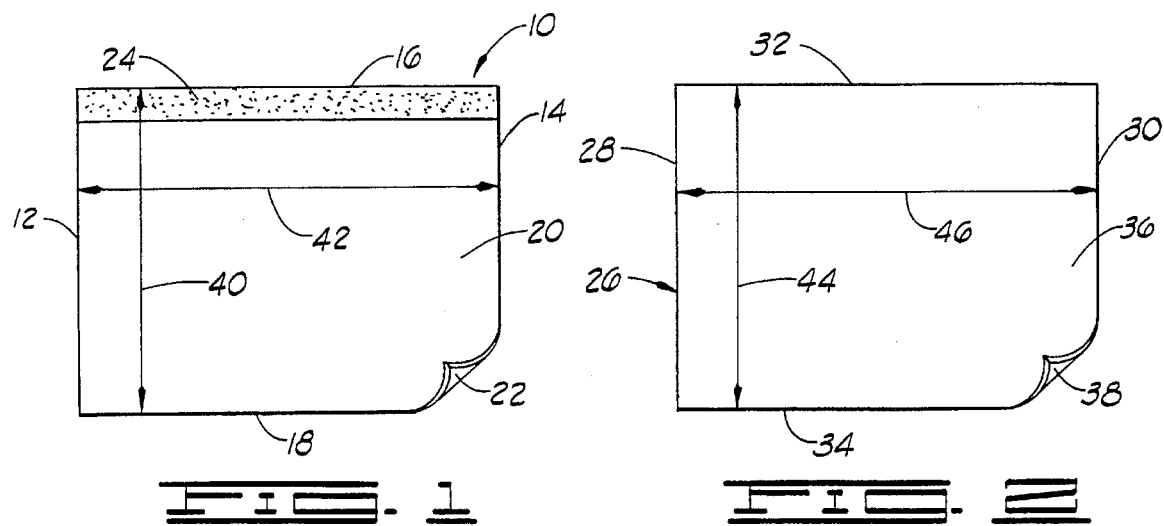
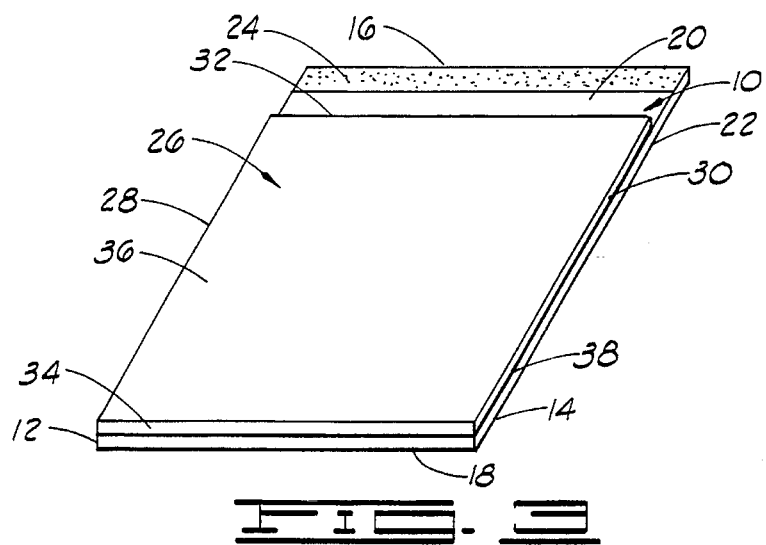
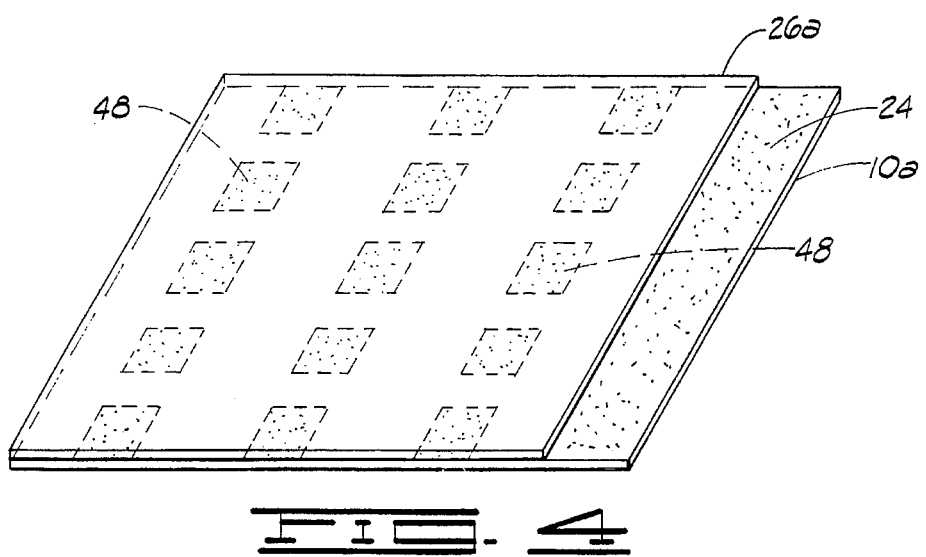

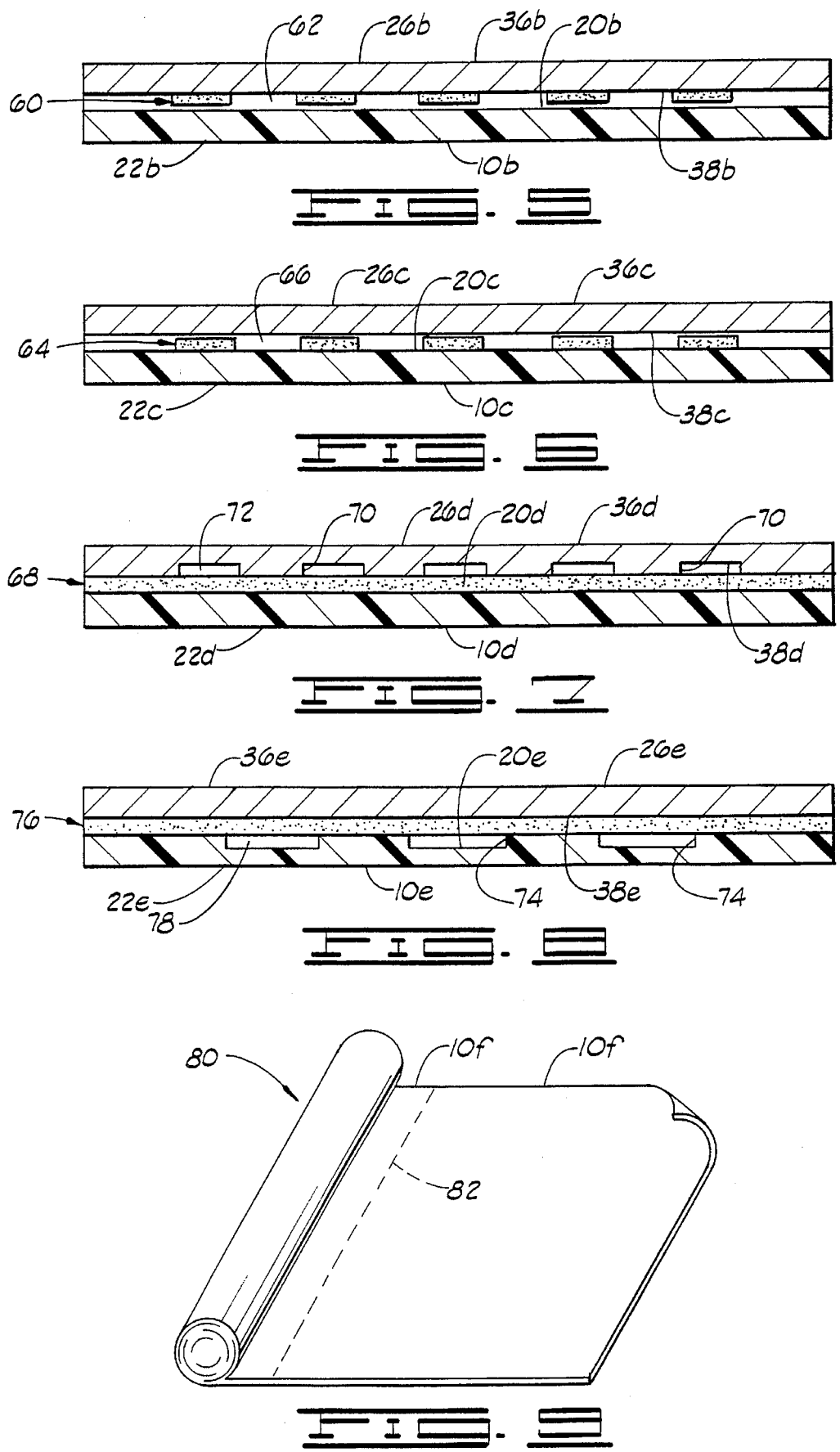

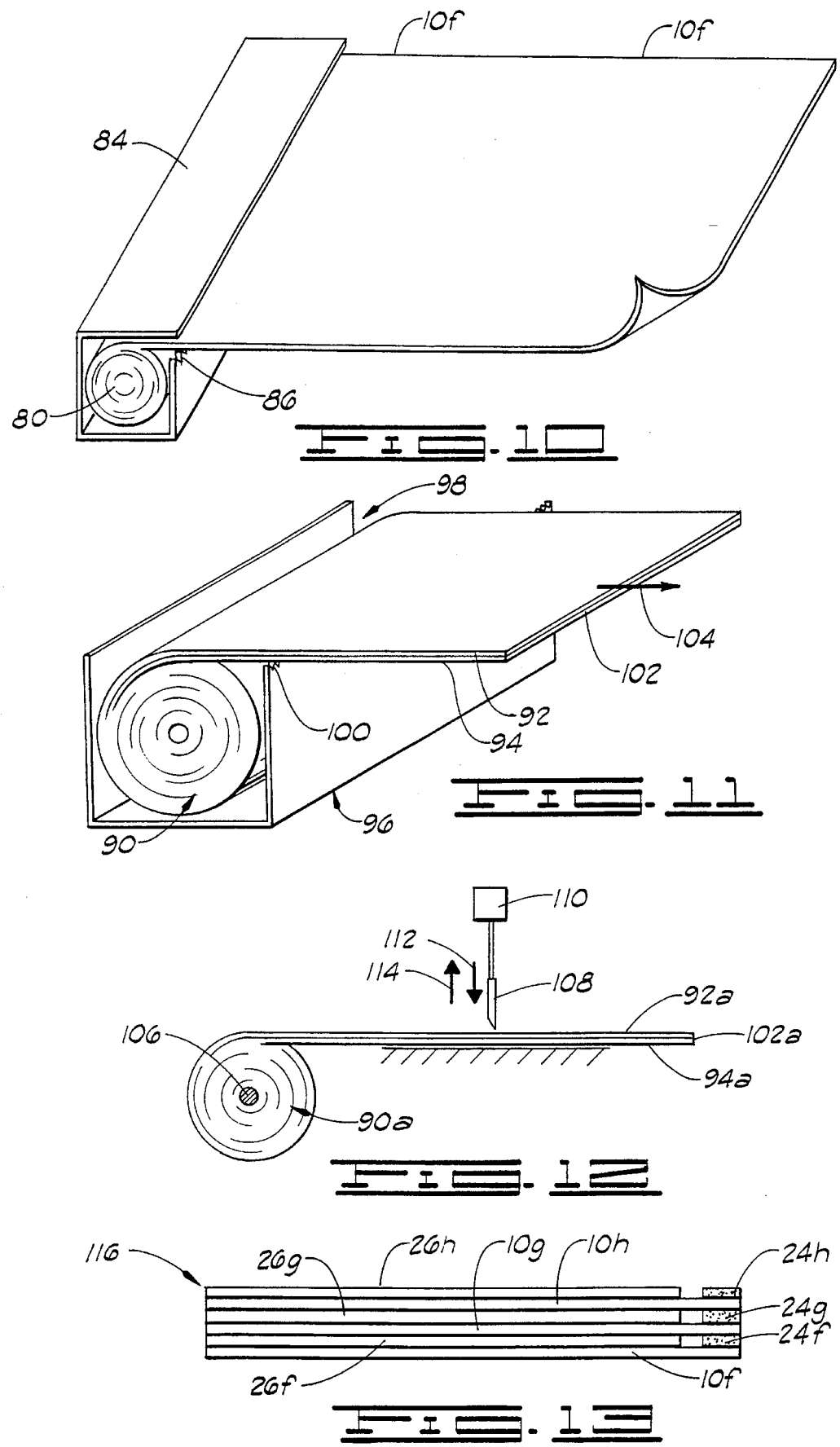

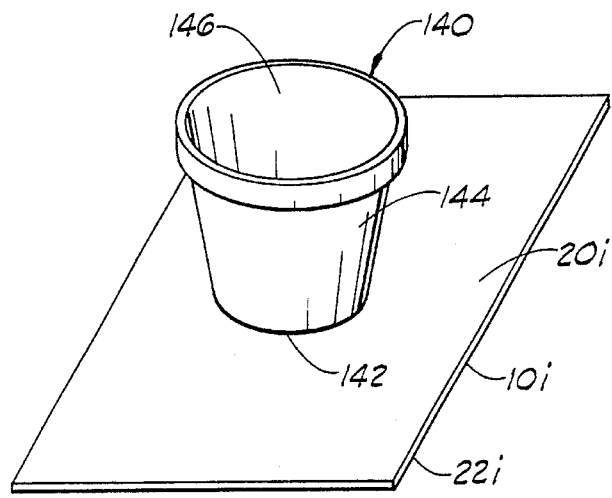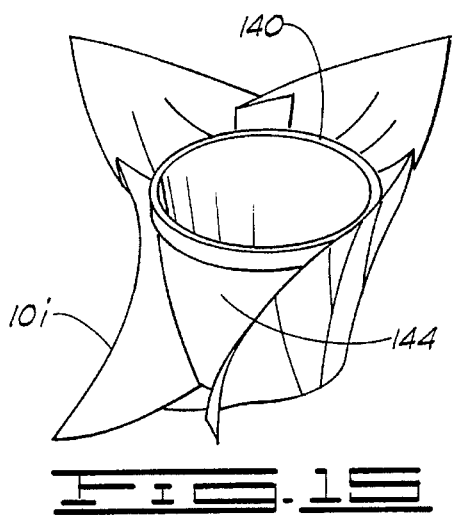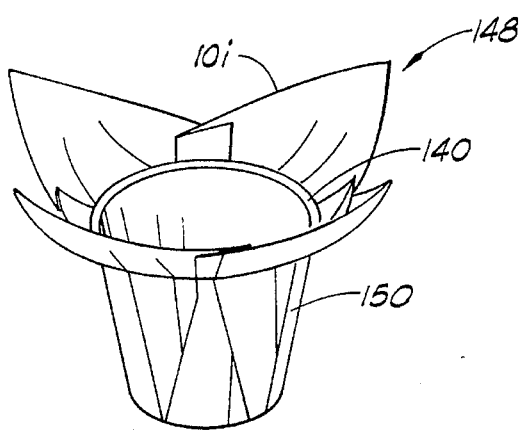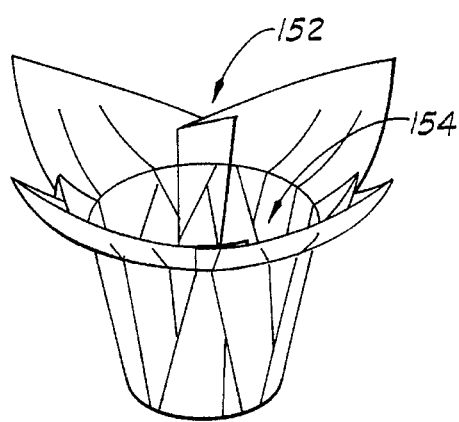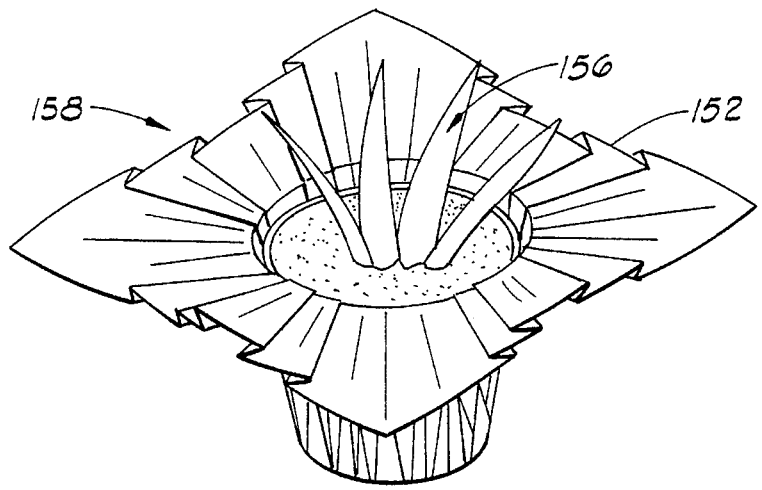

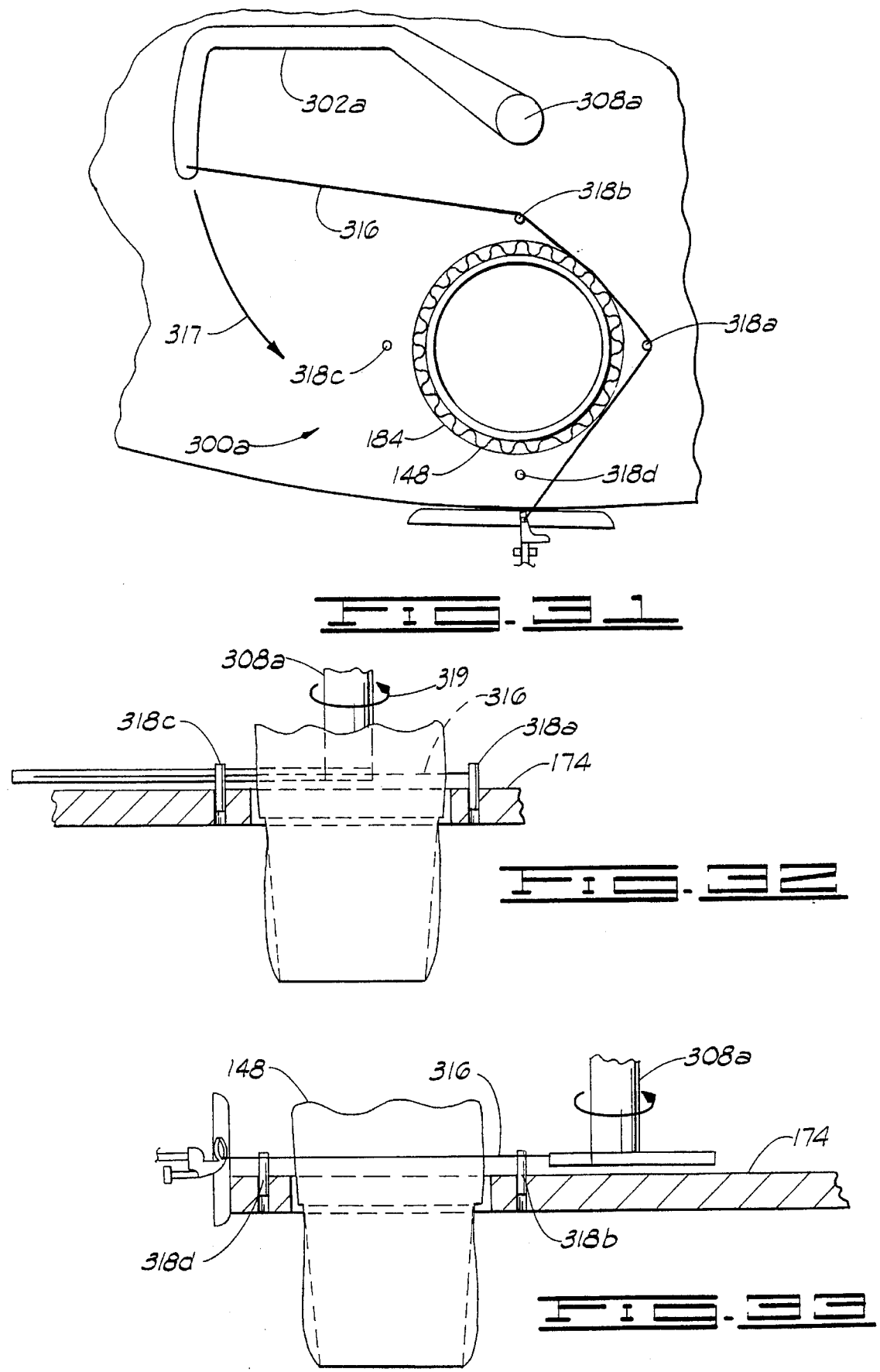

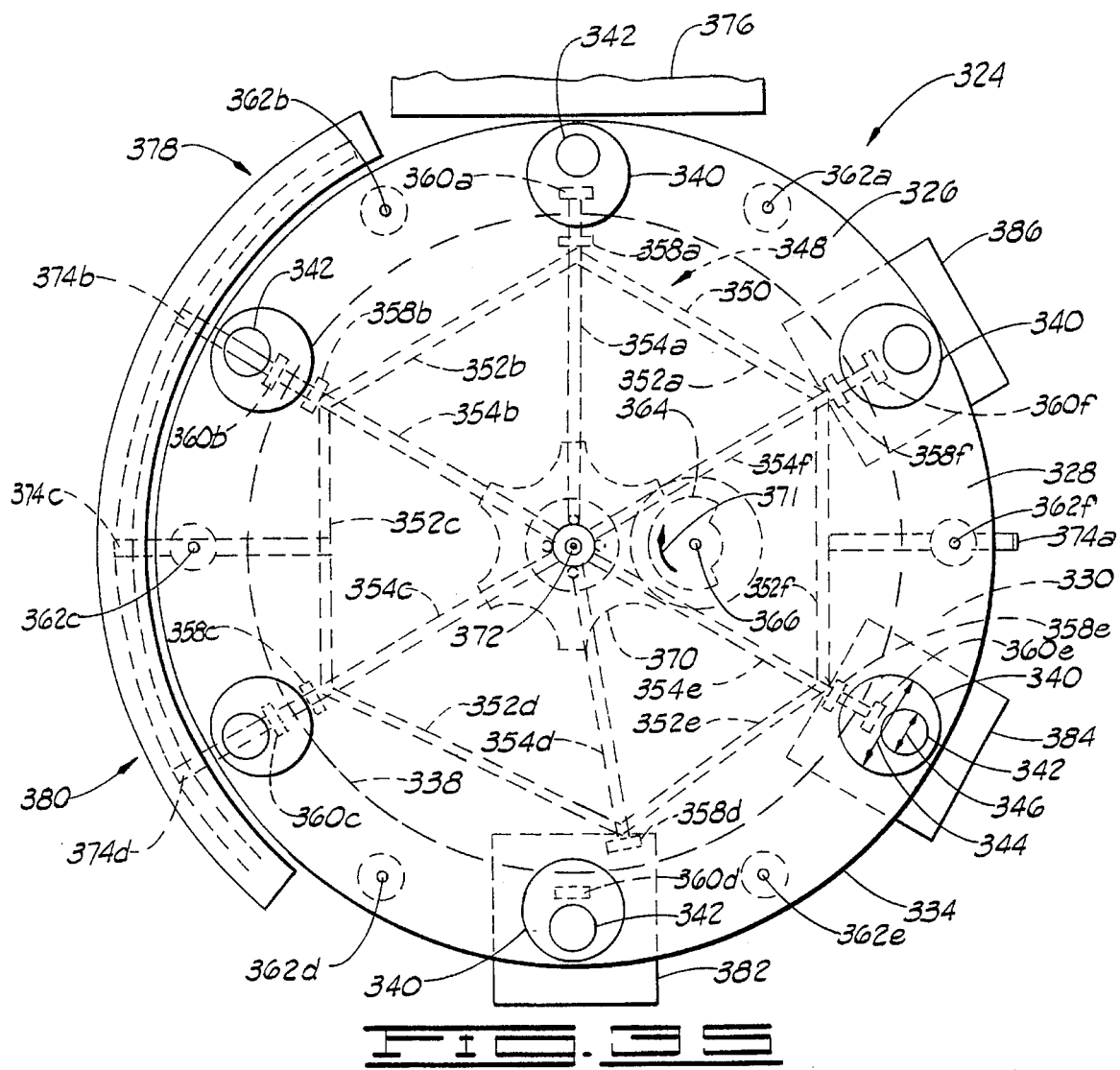
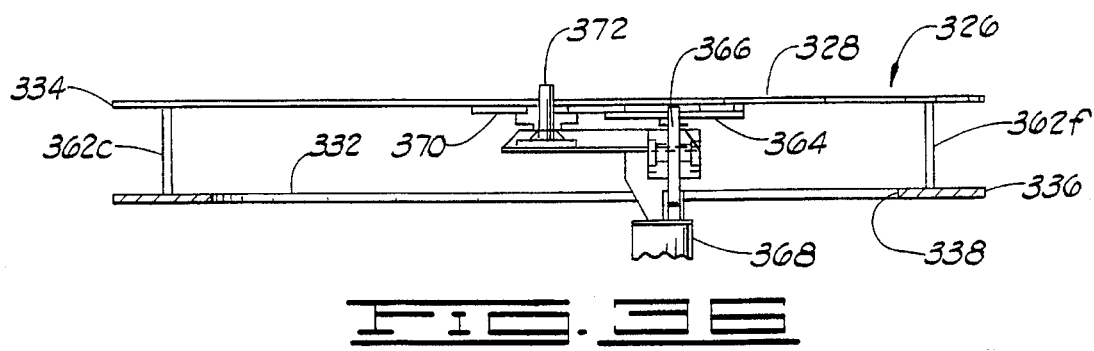

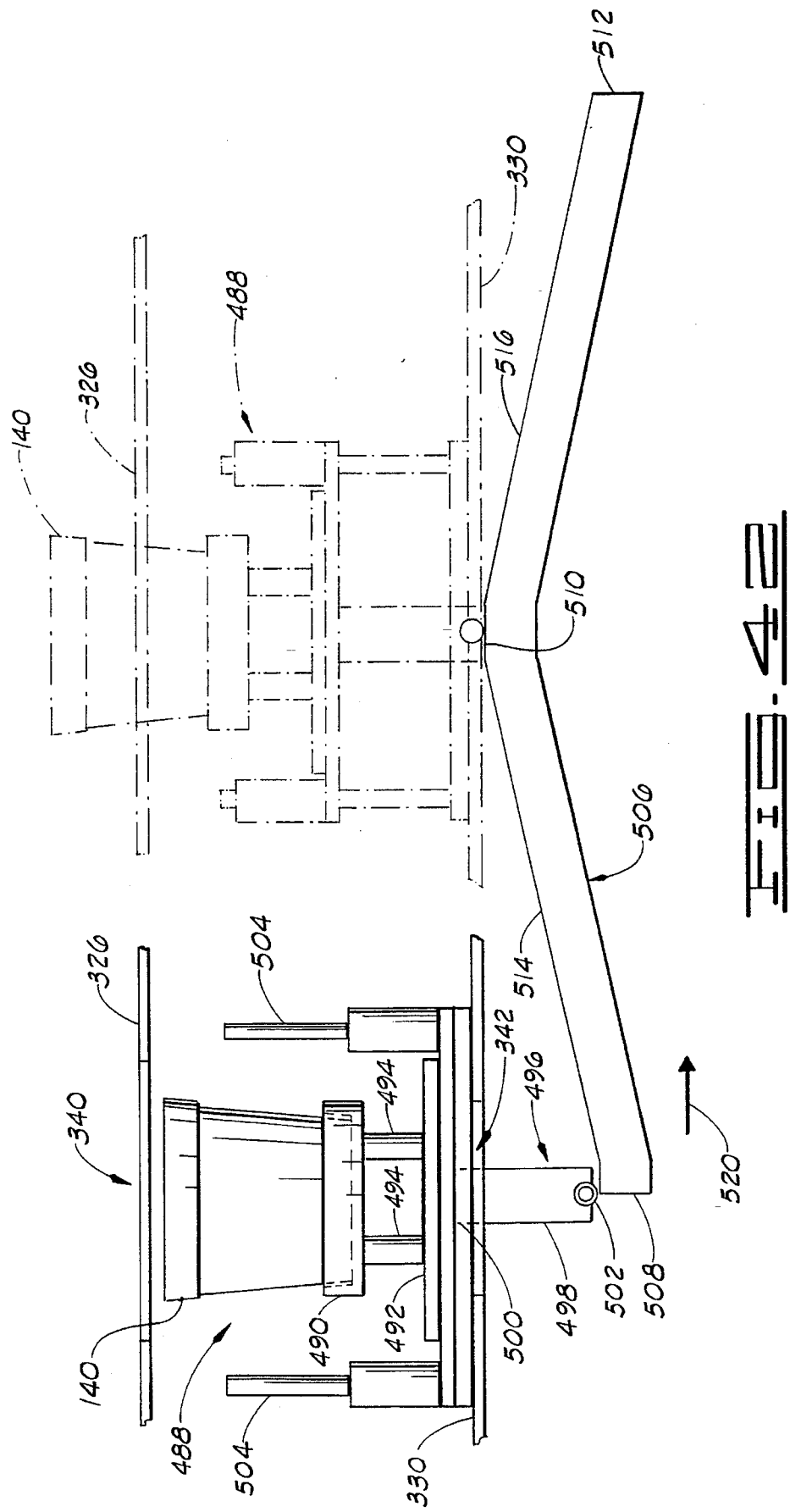

5,481,850

ROTARY COVERING AND FASTENING SYSTEM

CROSS REFERENCE TO RELATED APPLICATIONS

The present application is a continuation-in-part of U.S. Ser. No. 07/819,311, filed Jan. 9, 1992, entitled Means For Securing A Decorative Cover About A Flower Pot, now abandoned; which is a continuation of U.S. Ser. No. 07/765, 416, filed Sep. 26, 1991, entitled Means For Securing A Decorative Cover About A Flower Pot, now U.S. Pat. No. 5,105,599; which is a continuation of U.S. Ser. No. 07/530, 491, filed May 29, 1990, entitled Means For Securing A Decorative Cover About A Flower Pot, now abandoned; which is a continuation of U.S. Ser. No. 07/315,169, filed Feb. 24, 1989, entitled Means For Securing A Decorative Cover About A Flower Pot, now abandoned.

BACKGROUND

The present invention relates to an apparatus and method for placing a cover about an article, automatically applying a fastener about the covered article and removing the covered article, and more particularly, but not by way of limitation, to such apparatus and methods wherein the article is a potted plant.

SUMMARY

The present invention is directed to an apparatus and method for forming a cover about an article and for automatically fastening the cover to the article, and optionally for automatically placing a label on the covered article. The article may be an article such as a potted plant and the cover may be a decorative cover. The invention satisfies the need for rapidly covering and fastening the cover about an article with a minimal amount of manual effort and in a location having a limited amount of available space.

The apparatus comprises a rotatable platform having a support surface formed thereon. At least one opening sized to receive the article extends through the support surface. The support surface is adapted to support at least portions of a sheet of material in a position generally over the opening. A cover forming assembly is disposed in the opening in the support surface. The cover forming assembly has contacting portions for contacting the sheet of material. The opening and the cover forming assembly disposed therein are configured to receive the article.

The apparatus further comprises a control assembly for controlling the rotation of the platform. The apparatus also comprises a fastening assembly such as a tying device for automatically applying a fastener about a portion of the outer surface of the covered article for fastening the cover about the article when the platform is rotated into a fastening position.

The apparatus may also comprise a labeling device for automatically applying a label to a portion of the outer surface of the cover of the covered article when the platform is rotated into a labeling position. The apparatus may further comprise an assembly for securing and releasing the sheet of material in the cover forming position so the sheet is immobilized until after the sheet is moved to the forming position. The apparatus may further comprise an assembly for automatically placing a sheet of material on the support surface. The apparatus may further comprise a pick and place apparatus for automatically picking the article up from an article supply and placing the article into the opening to form the covered article. The apparatus may further comprise means for automatically removing the covered article from the opening of the platform.

The present invention also comprises a method for processing an article. The process initially comprises providing a rotatable platform having means for rotation. The platform has a support surface formed thereon and an opening extending through the support surface. The opening is sized to receive a cover forming assembly and has such a cover forming assembly disposed therein. The cover forming assembly has contacting portions and is sized to receive an article, which may be a flower pot. The next step is placing a sheet of material in a cover forming position over the opening and on the support surface wherein the sheet of material, in the cover forming position, is positioned over the cover forming assembly.

The next step is rotating the platform to move the opening into a forming position at a forming station. Next, the article is provided. The article is positioned in a position over the sheet of material so the article is disposed generally above and near the portion of the sheet of material which is above the cover forming assembly. Then, the article is moved in a direction which causes the lower end of the article to engage a portion of the sheet of material. The article and portions of the sheet of material pass through the cover forming assembly causing the sheet of material to contact or nearly contact both the outer peripheral surface of the article and the contacting portions of the cover forming assembly. The sheet is pressed about the outer peripheral surface of the article to form a cover about the article.

The platform is rotated so that the opening containing the covered article is moved into a fastening position at a fastening station. At the fastening station a fastener is automatically applied about a portion of the outer surface of the cover of the article for fastening the cover about the article. Then, the platform is rotated so that the opening containing the covered article is moved to a removal station. At the removal station, the covered article is removed from the platform.

The process may have the additional step of securing the sheet of material in the cover forming position for generally immobilizing the sheet then releasing the sheet until after the sheet is moved to the forming position. The step of picking up an article from an article supply and placing it in the opening may be done automatically.

The step of removing the covered article may further comprise automatically removing the covered article from the opening of the platform. Also, the method may comprise the additional step of rotating the platform so the opening containing the covered article is moved to a labeling position for engaging an automatic labeling means and automatically applying a label to a portion of the outer surface of the cover of the article.

DESCRIPTION OF THE DRAWINGS

FIG. 1 is a plan view of a first sheet of material with one end turned up and constructed in accordance with the present invention.

FIG. 2 is a plan view of a second sheet of material with one end turned up and constructed in accordance with the present invention.

FIG. 3 is a perspective view showing the first and the second sheets of material disposed adjacent each other.

FIG. 4 is a perspective view showing bonding areas on the surface of a first sheet or a second sheet which cause bonding of the second sheet and the first sheet.

FIG. 5 is a sectional view of a modified first and second sheets of material.

FIG. 6 is another cross-sectional view of a modified first sheet of material connected to a modified second sheet of material.

FIG. 7 is a cross sectional view of still another modified first sheet of material connected to a modified second sheet of material.

FIG. 8 is another cross-sectional view of yet another modified first sheet of material connected to a modified second sheet of material.

FIG. 9 is a diagrammatic view of a plurality of sheets of material, constructed in accordance with the present invention forming a continuous roll, the roll partially unrolled to reveal a single sheet still attached thereto.

FIG. 10 is a diagrammatic view of a plurality of sheets of material forming a continuous roll of material disposed in a dispenser.

FIG. 11 is a diagrammatic view showing a roll of material wherein the roll of material comprises a first and a second sheet of material constructed in accordance with the present invention disposed in a dispenser (diagrammatically shown in FIG. 11) for dispensing the first and the second sheets of material from the roll of material.

FIG. 12 is a diagrammatic view of a roll of material for dispensing a first and a second sheet of material constructed in accordance with the present invention from the roll of material.

FIG. 13 is a side elevational view of a pad of first and second sheets of material constructed in accordance with the present invention.

FIG. 14 is a perspective view of another embodiment of a sheet of material of the present invention, and a pot disposed upon the sheet.

FIG. 15 is a perspective view of the sheet of material of FIG. 14, showing a sheet of material partially wrapped about a flower pot.

FIG. 16 is a perspective view of the sheet of material wrapped about a flower pot.

FIG. 17 is a perspective view of a pre-formed decorative pot cover.

FIG. 18 is a perspective view of a potted plant wrapped by a sheet of material to form a covered potted plant.

FIG. 31 is a plan view of a cover forming assembly which applies a band above the upper support assembly.

FIG. 32 is a side elevational view of the tying assembly of FIG. 31 as viewed from one angle.

FIG. 33 is a side elevational view of the tying assembly of FIG. 31 as viewed from a second angle.

FIG. 35 is a plan view of another version of the present invention.

FIG. 36 is a side elevational view of the upper portion of the embodiment of FIG. 35.

FIG. 42 is a side view of a cam assembly for elevating a pot support assembly to facilitate pot removal.

DESCRIPTION OF THE PREFERRED EMBODIMENTS

The Embodiments of FIGS. 1–3

Figure 19:
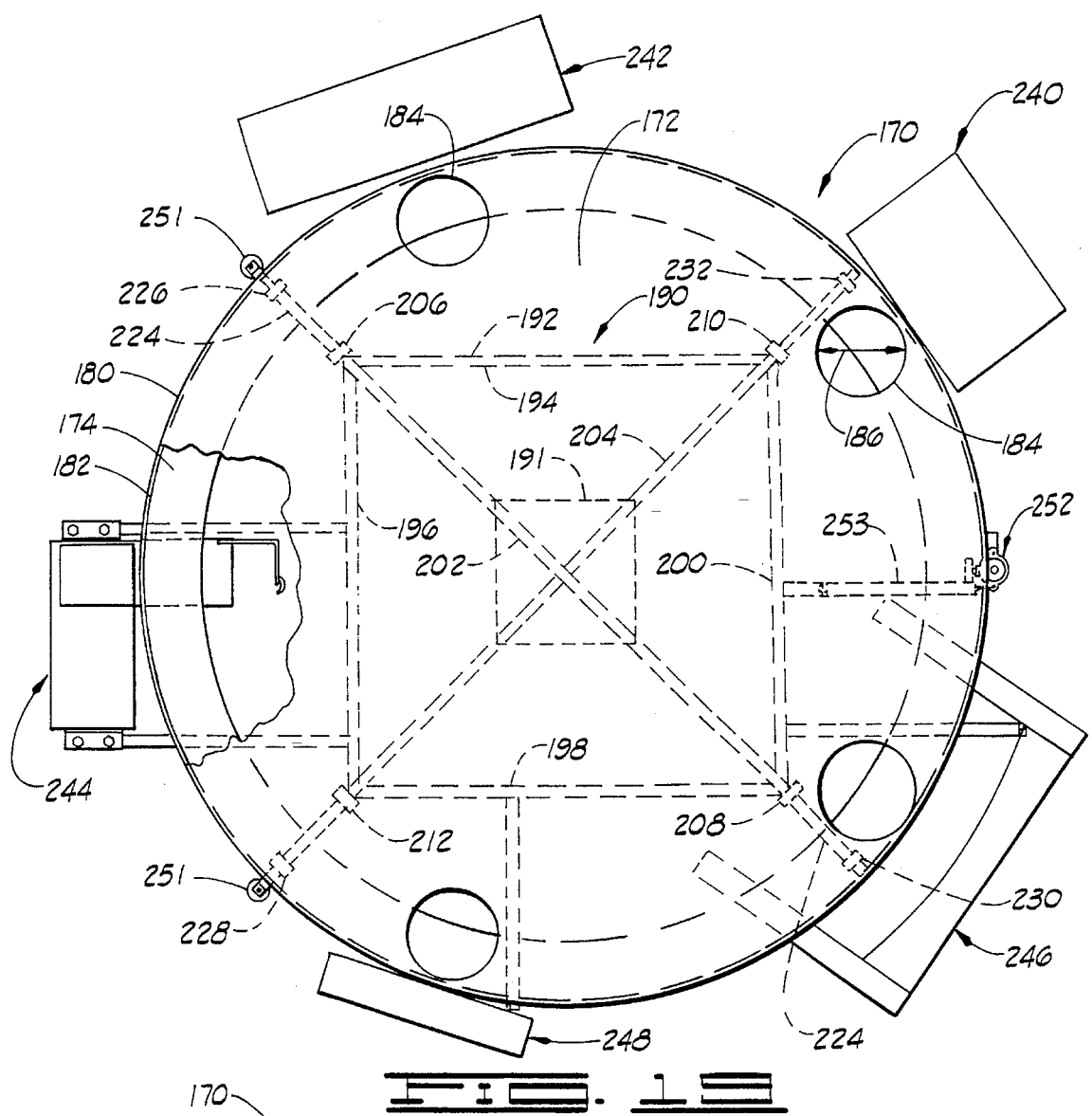
FIG. 19 is a plan view of a version of the present invention.

Shown in FIG. 1 and designated therein by the general reference numeral 10 is a sheet of material. The sheet of material 10 has a first end 12, a second end 14, a first side 16, a second side 18, an upper surface 20 and a lower surface 22.

A closure bonding material 24 may be disposed on the upper surface 20 of the sheet of material, alternatively, the sheet of material 10 may be free of a closure bonding material. As shown in FIG. 1, the closure bonding material 24, if present, may be disposed adjacent the first side 16 of the sheet of material 10 and extends between the first and the second ends 12 and 14 of the sheet of material 10 or it may be disposed on any other portion of the sheet 10. As shown in FIG. 1, the closure bonding material 24 is disposed on the upper surface 20 in a strip of closure bonding material 24, although the closure bonding material 24 also could be applied to the upper surface 20 of the sheet of material 10 in the form of spaced apart spots or the closure bonding material 24 also could be disposed on the upper surface 20 of the sheet of material 10 in any other geometric form and in any pattern including covering the entire upper surface 20 of the sheet of material 10. In this last-mentioned instance, the closure bonding material and the connecting bonding material would be contained within the bonding material covering the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a square or rectangular shape is shown in FIG. 1 only by way of example. The sheet of material 10 for example only may be square, rectangular, circular or any other geometric shape such as heart shaped, for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a plant or flower pot, as described herein. The layers of material comprising the sheet of material 10 may be connected together or laminated or may be separate layers.

Shown in FIG. 2 is a second sheet of material 26. The second sheet of material 26 has a first end 28, a second end 30, a first side 32, a second side 34, an upper surface 36 and a lower surface 38. The second sheet of material 26, if used is preferably constructed of paper. The term "paper" as used herein means treated or untreated paper, corrugated paper or cardboard or any other form of paper material.

The first sheet of material 10 has a length 40 extending between the first and the second sides 16 and 18 of the sheet of material 10. The first sheet of material 10 also has a width 42 extending between the first and the second ends 12 and 14 of the first sheet of material 10.

The second sheet of material 26 has a length 44 extending between the first and the second sides 32 and 34 of the second sheet of material 26. The second sheet of material 26 has a width 46 extending between the first and the second ends 28 and 30 of the second sheet of material 26. In a preferred embodiment, the length 44 of the second sheet of material 26 is less than the length 40 of the first sheet of material 10 as shown in FIG. 3 so that, when the first sheet of material 10 is disposed adjacent the second sheet of material 26, a portion of the first sheet of material 10 adjacent the first side 16 thereof extends a distance beyond the first side 32 of the second sheet of material 26, in a manner and for reason which will be described in greater detail below.

The first sheet of material has a thickness in a range from about 0.5 mils to about 30 mils and preferably the thickness of the first sheet of material is in a range from about 0.5 mils to about 10 mils. The first sheet of material 10 is constructed of a material which is flexible.

The second sheet of material 26 has a thickness in a range from about 0.1 mils to about 30 mils and preferably in a range from about 0.1 mils to about 10 mils. The second sheet of material 26 is flexible, but relatively rigid compared to the first sheet of material 10.

The second sheet of material 26 may be any shape and a square or rectangular shape is shown in FIG. 2 only by way of example. The second sheet of material 26 for example only may be square, rectangular, circular or any other geometric shape.

The second sheet of material 26 may be constructed of a single layer of materials or a plurality of layers of the same or different types of materials. Any thickness of the second sheet of material 26 may be utilized in accordance with the present invention as long as the second sheet of material 26 is wrappable about an object such as a flower pot, as described herein, and as long as the second sheet of material 26 provides the rigidity described herein or the absorbency described herein or both. The layers of material comprising the second sheet of material 26 may be connected together or laminated or may be separate layers.

In operation, when a second sheet of material 26 is desired in addition to the first sheet of material 10, the second sheet of material 26 is placed adjacent the first sheet of material 10 as shown in FIG. 3. In this position, the lower surface 38 of the second sheet of material 26 is disposed adjacent the upper surface 20 of the first sheet of material 10. The width 42 of the first sheet of material 10 is about equal to the width 46 of the second sheet of material 26 so that, when the first and the second sheets of material 10 and 26 are disposed adjacent each other, the first end 28 of the second sheet of material is generally aligned with the first end 12 of the first sheet of material 10, the second end 30 of the second sheet of material 26 is generally aligned with the second end 14 of the first sheet of material 10, the second side 18 of the first sheet of material 10 is generally aligned with the second side 34 of the second sheet of material and the first side 16 of the first sheet of material 10 extends a distance beyond the first side 32 of the second sheet of material 26 so that the closure bonding material 24 on the upper surface 20 of the first sheet of material 10 is exposed and not covered by the second sheet of material 26.

It should be noted that the first and the second sheets of material 10 and 26 each could have virtually identical lengths 40 and 44. In this case, the second sheet of material 26 is disposed on the first sheet of material 20 in such a manner that the second side 34 of the second sheet of material 26 extends a distance beyond the second side 18 of the first sheet of material 10 whereby the first side 16 of the first sheet of material 10 is spaced a distance from the first side 32 of the second sheet of material 26 thereby leaving the closure bonding material 24 on the first sheet of material 10 exposed and not covered by the second sheet of material 26. And multiple sheets of material 10 and 26 may be used. Moreover, when multiple sheets of material 10 and 26 are used in combination, the sheets of material 10 and 26 need not be uniform in size or shape. Finally, it will be appreciated that the sheets of material 10 and 26 shown in all embodiments herein are substantially flat.

As noted earlier, a closure bonding material may be disposed on the upper surface of the first sheet of material 10. The closure bonding material 24 may be applied as a strip or as spots or other shapes. One method for disposing a closure bonding material, in this case an adhesive, is described in U.S. Pat. No. 5,111,637 entitled "Method For Wrapping A Floral Grouping" issued to Weder et al., on May 12, 1992 and which is hereby incorporated herein by reference.

The first sheet of material 10 can be utilized alone or in combination with the second sheet of material 26 to wrap a potted plant or flower pot. The term "flower pot" refers to any type of container used for holding a floral grouping or a potted plant. Examples of flower pots used in accordance with the present invention are clay pots, plastic pots, and the like. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The first sheet of material 10 or the second sheet of material 26 may be constructed of a single layer of material or a plurality of layers of the same or different types of materials. Any thickness of the sheet of material 10 or 26 may be utilized in accordance with the present invention as long as the sheet of material 10 or 26 may be wrapped or formed about at least a portion of a portion of a flower pot, as described herein. Additionally, an insulating material such as bubble film, preferable as one of two or more layers, can be utilized in order to provide additional protection for the item wrapped therein.

In a preferred embodiment, the first sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 10 may be connected together or laminated or may be separate layers.

The sheet of material 10 is constructed from any suitable wrapping material that is capable of being wrapped about a flower pot or floral grouping, as the case may be. Preferably, the wrapping material 10 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or 26 may vary in color. Further, the sheet of material 10 or 26 may consist of designs or decorative patterns which are printed, etched, and/or embossed thereon using inks or other printing materials. An example of an ink which may be applied to the surface of the sheet of material 10 or 26 is described in U.S. Pat. No. 5,147,706 entitled "Water Based Ink 0n Foil And/Or synthetic organic polymer" issued to Kingman on Sep. 15, 1992 and which is hereby incorporated herein by reference. In addition, the sheet of material 10 or 26 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or 26. Moreover, each surface of the sheet of material 10 or 26 may vary in the combination of such characteristics. The sheet of material 10 or 26 itself may be opaque, translucent or partially clear or tinted transparent.

Embodiments of FIGS. 4–8

Referring now to FIG. 4, a bonding material may be applied to either the upper surface of a first sheet of material 10a or to the lower surface of a second sheet 26a of material in a plurality of patches 48 for the purpose of bonding the upper surface of the first sheet 10a to the lower surface of the second sheet 26a.

Shown in FIG. 5 is a modified first sheet of material 10b connected to a modified second sheet of material 26b. The first sheet of material 10b is constructed exactly like the sheet of material 10. The second sheet of material 26b is constructed like the sheet of material 26 described in detail before and shown in FIG. 2, except the second sheet of material 26b includes a bonding material 60 disposed on the lower surface 38b of the second sheet of material 26b. The bonding material 60 is in the form of a plurality of spaced apart spots of bonding material 60, similar to that shown in FIG. 4. The lower surface 38b of the second sheet of material 26b is bondingly connected to the upper surface 20b of the first sheet of material 10b by way of the bonding material 60. Since the bonding material 60 is in the form of a plurality of spaced apart spots, a plurality of spaced apart spaces 62 (only one of the spaces 62 being designated by reference numeral in FIG. 5) are formed between the lower surface 38b of the second sheet of material 26b and the upper surface 20b of the first sheet of material 10b. The spaces 62 provide air gaps which form an insulation when the first and the second sheets of material 10b and 26b are wrapped about a flower pot in a manner and for reasons like that described herein.

Shown in FIG. 6 is a modified first sheet of material 10c connected to a modified second sheet of material 26c. The first sheet of material 10c is constructed exactly like the sheet of material 10 shown in FIG. 1, except the first sheet of material 10c includes a bonding material 64 disposed on the upper surface 20c of the first sheet of material 10c. The bonding material 64 is in the form of a plurality of spaced apart spots of bonding material 64, similar to that shown in FIG. 5. The lower surface 38c of the second sheet of material 26c is bondingly connected to the upper surface 20c of the first sheet of material 10c by way of the bonding material 64. Since the bonding material 64 is in the form of a plurality of spaced apart spots, a plurality of spaces 66 (only one of the spaces 66 being designated by a reference numeral in FIG. 6) are formed between the lower surface 38c of the second sheet of material 26c and the upper surface 20c of the first sheet of material 10c. The spaces 66 provide air gaps which form an insulation when the first and the second sheets of material 10c and 26c are wrapped about a flower pot in a manner and for reasons like that described herein in connection with FIG. 5.

Shown in FIG. 7 is a modified first sheet of material 10d connected to a modified second sheet of material 26d. The first sheet of material 10d is constructed exactly like the sheet of material shown in FIG. 1, except the first sheet of material 10d includes a bonding material 68 on the upper surface 20d thereof. The second sheet of material 26d is constructed exactly like the second sheet of material 26 shown in FIG. 2, except the second sheet of material 26d includes a plurality of spaced apart raised portions 70. The raised portions 70 may be formed by embossing the second sheet of material 26d or forming corrugations in the second sheet of material 26d or in any other manner desired in any particular application.

The upper surface 20d of the first sheet of material 10d is disposed generally adjacent the lower surface 38d of the second sheet of material 20d or, more particularly, adjacent the raised portions 70 on the second sheet of material 26d. In this position, the raised portions 70 are bonded to the upper surface 20d of the first sheet of material 10d by way of the bonding material 68 to connect the first sheet of material 10d to the second sheet of material 20d.

The spaced apart raised portions 70 on the second sheet of material 26d form a plurality of spaces 72 between the first sheet of material 10d and the second sheet of material 26d in a connected position of the first and the second sheets of material 10d and 26d for providing insulation when the first and second sheets of material 10d and 26d are connected together and wrapped about a flower pot in a manner like that described herein.

Shown in FIG. 8 is a modified first sheet of material 10e connected to a modified second sheet of material 26e. The first sheet of material 10e is constructed exactly like the sheet of material 10 shown in FIG. 1, except the first sheet of material 10e includes a plurality of spaced apart raised portions 74. The raised portions 74 may be formed in the first sheet of material 10e by embossing the first sheet of material 10e or forming corrugations in the first sheet of material 10e or in any other suitable manner. The second sheet of material 26e is constructed exactly like the second sheet of material 26 shown in FIG. 2, except the second sheet of material 26e includes a bonding material 76 disposed on the lower surface 38e thereof.

In operation, the upper surface 20e of the first sheet of material 10e is disposed generally adjacent the lower surface 38e of the second sheet of material 26e or, more particularly, the raised portions 74 on the first sheet of material 10e are disposed adjacent the lower surface 38e of the second sheet of material 26e. In this position, the first sheet of material 10e is bondingly connected to the second sheet of material 26e by way of the bonding material 76 on the second sheet of material 26e or, more particularly, the bonding material 76 on the second sheet of material 26e bondingly engages and bondingly connects to the raised portions 74 on the first sheet of material 10e to connect the first sheet of material 10e to the second sheet of material 26e. In this connected position of the first sheet of material 10e and the second sheet of material 26e, the raised portions 74 cooperate to form a plurality of spaces 76. Between the first sheet of material 10e and the second sheet of material 26e. The spaces 76 cooperate to provide an insulation when the first and the second sheets of material 10e and 26e are wrapped about a flower pot in a manner and for reasons like that described herein.

Embodiments of FIGS. 9–10

Referring now to FIG. 9, a plurality of individual sheets of material 10f are connected linearly together to form a roll 80. Preferably, the plurality of sheets of material 10f in the roll 80 are connected by perforations 82, as illustrated in FIG. 9. Such a roll 80 permits one sheet of material 10f to be withdrawn from the roll 80, then severed or disconnected from the roll 80. Alternatively, as shown in FIG. 10, the roll 80 may simply be formed as a continuous roll 80 of wrapping material without perforations, wherein a plurality of sheets of material 10f may be removed from the roll 80 by unrolling a portion of the roll 80, and using a separate cutting element (not shown) to sever the unrolled portion of the roll 80 of material to form the sheet of material 10f. The roll 80 may also be contained within a dispenser 84, as illustrated in FIG. 10. When the roll 80 is disposed in the dispenser 84, a portion of the wrapping material is again unrolled, and a serrated cutting edge 86 contained within the dispenser 84, or a separate cutting element (not shown), severs the unrolled portion of the wrapping material from the roll 80 to form a sheet of material 10f. Any number of sheets of material 10f may form the roll 80 as long as it is possible to withdraw at least one sheet 10f from the roll 80 as described herein.

Embodiments of FIGS. 11–12

The first and the second sheets of material described herein can be provided in the form of a roll of first and second sheets of material wherein the first and the second sheets of material are unrolled from the roll of first and second sheets of material and the first and the second sheets of material are severed from the roll either by perforations at spaced apart locations in the roll or by cutting the first and the second sheets of material from the roll. It also should be noted that additional sheets of material may be combined with the first and the second sheets of material if so desired in a particular application.

Shown in FIG. 11 is a roll of material 90 comprising a first material 92 and a second material 94 with the second material 94 being disposed adjacent the first material 92. The first material 94 is constructed of any of the materials described before with respect to the first sheet of material. The second material 94 is constructed of any of the materials described before with respect to the second sheet of material.

The roll of material 90 is disposed in a dispenser 96 having an opening 98 through which the materials 92 and 94 may be withdrawn from the roll of material 90. A cutting edge 100 is disposed on the dispenser 96 near the opening 98. The cutting edge 100 may be a sawtooth type of edge, as shown in FIG. 11, or the cutting edge 100 may be any other type of edge or device suitable for cutting a portion of the materials 92 and 94 from the roll of material 90 and the cutting edge 100 may be connected to the dispenser 96 or may be a separate component if desired in particular application.

The roll of material 90 has a leading edge 102. In operation, the leading edge 102 is gripped or a portion of the first and/or the second materials are gripped and the first and the second materials are unrolled and withdrawn from the roll of material 90 in a direction 104. The first and the second materials 92 and 94 are withdrawn or unrolled from the roll of material 90 until a desired length of the first and the second materials 92 and 94 have been withdrawn from the roll of material 90. In this position, a portion of the first and the second materials 92 and 94 are disposed adjacent the cutting edge 100. The first and the second materials 92 and 94 then are maneuvered to pass the first and the second materials 92 and 94 over the cutting edge 100 thereby severing a portion of the material extending a distance from the leading edge 102 thereof from the roll of material 90. The portion of the first and the second materials 92 and 94 withdrawn from the roll of material 90 and severed from the roll of material 90 comprise the first and the second sheets of material as described herein.

The first and the second materials 92 and 94 in the roll of material 90 may be connected or unconnected. Further, the roll of material 90 may comprise two rolls of material with one of the rolls of material comprising the first material 92 and the other roll of material comprising the second material 94. In this last-mentioned embodiment, the first material 92 is withdrawn from the first roll of material and the second material 94 is withdrawn from the second roll of material about simultaneously so that the first and the second materials 92 and 94 are provided in a manner as generally shown in FIG. 11 for severing from the first and second rolls of material to provide the first and the second sheets of material as described herein. The term "roll of material" as used herein is intended to encompass two or more rolls in the manner generally described.

Shown in FIG. 12 is a modified roll of material 90a comprising a first material 92a and a second material 94a with a leading edge 102a. The roll of material 90a is constructed exactly like the roll of material 90 described before, except the roll of material 90a is not disposed in a dispenser constructed like the dispenser 96 shown in FIG. 11. Rather, the roll of material 90a is supported on a generally mounted shaft 106. The first and the second sheets of material 92a and 94a are withdrawn from the roll of material 90a in a manner like that described before in connection with FIG. 11 until a predetermined length of the first and the second materials 92a and 94a have been withdrawn from the roll of material 90a. In this position, a portion of the first and the second materials 92a and 94a are disposed under a knife edge 108. The knife edge 108 is connected to an actuator 110 adapted to move the knife edge 108 in a direction 112 and in a direction 114. When the predetermined length of the first and the second materials 92a and 94a have been withdrawn from the roll of material 90a, the actuator 110 actuates to move the knife edge 108 in the direction 112 to a position wherein the knife edge 108 severingly engages the materials 92a and 94a to severingly cut a portion of the first and the second materials 92a and 94a from the roll of materials 90a to provide the first and the second sheets of material as described herein. The actuator 110 may comprise a hydraulic or pneumatic cylinder or a motor and gear arrangement or any other form of arrangement suitable for moving the knife edge 108 in the directions 112 and 114. After the knife edge 108 has cuttingly severed the desired portion of the first and the second sheets of material 92a and 94a from the roll of material 90a, the actuator 110 is actuated to move the knife edge 108 in the direction 114 to a storage position disposed a distance above the first and the second materials 92a and 94a as opposed to the cutting position previously described.

Embodiment of FIG. 13

Shown in FIG. 13 is a pad 116 of first sheets of materials designated by the reference numerals 10f, 10g, and 10h in FIG. 13 and a plurality of second sheets of material designated in FIG. 13 by the reference numerals 26f, 26g and 26h. The first sheets of material 10f, 10g and 10h may be constructed like the sheet of material 10 shown in FIG. 1 and described in detail before and the second sheets of material 26f, 26g and 26h may be constructed like the second sheet of material 26 shown in FIG. 2 and described in detail before, or like any of the other first and the second sheets of material described herein. The first and the second sheets of material 10f, 10g, 10h, 26f, 26g and 26h are connected in the form of a pad 116 with the closure bonding material 24f, 24g and 24h cooperating to connect the first sheets of material 10f, 10g and 10h in the form of the pad 116. The second sheets of material 26f, 26g and 26h may be connected to the respective first sheets of material 10f, 10g and 10h or may be interleaved between the adjacent first sheets of material 10f, 10g and 10h in the pad 116. In the alternative, the second sheets of material 26f, 26g and 26h may be connected to form the pad 116 with the first sheets of material 10f, 10g and 10h being interleaved in the respective second sheets of material 26f, 26g and 26h and/or connected thereto. In operation, one of the first sheets of material 10f, 10g or 10h along with the adjacent second sheet of material 26f, 26g and 26h may be removed from the pad 116 and then placed in position to be wrapped about the flower pot.

Embodiments of FIGS. 14–18

As noted above, a first sheet of material 10 or a first sheet 10 and a second sheet of material 26 may be used to provide a decorative cover for an object such as a flower pot or a potted plant. To cover the object, the sheet or sheets may be manually or automatically placed in a position to be formed about the outer peripheral surface of the pot or potted plant as described in more detail below. Or, the sheet or sheets may be formed into a preformed cover which is then placed in a position to receive the pot or potted plant.

Referring to FIG. 14, to form a sheet of material 10i into a cover about a pot 140, the sheet of material 10i is disposed above an opening in a platform. The pot 140 is then disposed upon the upper surface 20i of the sheet of material 10i, so the lower end 142 of the pot 140 rests upon the portion of the upper surface 20i which is over the opening. The pot 140 has an outer peripheral surface 144 and an upper end 146. In one embodiment of a manual application of the sheet 10i about the pot 140, the pot 140 is manually pushed in a direction into the opening covered by the sheet 10i. The upper surface 20i of the sheet of material 10i is caused to be pressed about the outer peripheral surface 20i (FIG. 15) thereby engaging the outer peripheral surface 20i to form a cover 148 about the pot 140 as shown in FIG. 16. The lower surface 22i of the sheet of material 10i thereby becomes the outer surface 150 of the cover 148.

Another method for wrapping the sheet of material 10i about a pot 140 for forming such a cover is shown in U.S. Pat. No. 4,733,521 entitled "Cover Forming Apparatus" issued to Weder et al., on Mar. 29, 1988, which is hereby incorporated herein by reference.

A cover 148 formed by wrapping the sheet of material 10i about the flower pot 140 may be secured to the outer peripheral surface 144 of the pot 140 by the use of one or more bonding materials described herein. One particular method of securing the cover 148 to the pot 140 is by applying a band about the pot 140 to hold the covering in place such as is described in U.S. Pat. No. 5,105,599 entitled "Means For Securing A Decorative Cover About A Flower Pot" issued to Weder on Apr. 21, 1992 and which is hereby incorporated herein by reference.

Alternatively, the sheet of material may be preformed into a cover 152 having an opening 154 as shown in FIG. 17. The cover 152 is self-supporting by virtue of overlapping folds which are bonded to each other, thereby forming a rigid structure. The preformed cover 152 may be deposited into an opening in a table or platform to support the cover 152. A potted plant 156 can then be disposed into the opening 154 of the preformed cover 152, thereby resulting in a covered potted plant 158 as shown in FIG. 18.

One method for forming such a preformed plant cover or pot cover is shown in U. S. Pat. No. 4,773,182 entitled "Article Forming System" issued to Weder et al., on Sep. 27, 1988, which is hereby incorporated herein by reference.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

The present invention comprises an apparatus for fastening covers to a plurality of articles, such as potted plants.

In a preferred embodiment, the apparatus comprises a rotatable platform having a support surface formed thereon and a plurality of openings extending through the support surface. The support surface is adapted to support at least one sheet of material in a cover forming position over each opening. Each opening is sized to receive a cover former.

The apparatus further comprises a cover former disposed in each opening in the support surface. Each cover former has contacting portions for contacting the sheet of material. The opening and the cover former are adapted for receiving an article such as a flower pot having an upper end, a lower end, and an outer peripheral surface such that when the article is moved in a predetermined direction, such as downward, the lower end of the article is caused to engage a portion of the sheet of material disposed over the cover former in the opening. The article and portions of the sheet of material thus pass through the cover former causing the sheet of material to engage the outer peripheral surface of the article and the contacting portions of the cover former as the article is moved. As this happens, portions of the sheet contactingly engage or nearly engage the outer peripheral surface of the article forming a cover about the article and thereby forming a covered article. The cover of the covered article then has an inner surface facing the outer peripheral surface of the article and an exposed outer surface.

The apparatus further comprises a rotation assembly for controllably rotating the platform. Furthermore, the apparatus comprises a tying device for automatically applying a fastener about a portion of the outer surface of the covered article when the platform is rotated into a cover fastening position. In a preferred embodiment, the apparatus may comprise a labeling assembly for automatically applying a label to a portion of the outer surface of the cover of the covered article when the platform is rotated into a labeling position.

The sheet of material used in accordance with the present invention is constructed from a material selected from a group of materials consisting of paper, metal foil, cloth (natural or synthetic), denim, burlap or polymer film or combinations thereof. The apparatus may further comprise a securing assembly for releasably securing the sheet of material in the cover forming position for generally immobilizing the sheet until after the sheet is moved to the forming position. The apparatus may further comprise a sheet feeder for automatically placing a sheet of material on the support surface and/or a pick an place assembly for picking up the article from an article supply and for placing the article into the opening to form the covered article. Additionally, the apparatus may further comprise a removal assembly for automatically removing the covered article from the opening of the platform.

The present invention further comprises a method for processing a plurality of articles, such as flower pots. The first step comprises providing a rotatable platform having a rotation assembly for rotation. The platform has a support surface formed thereon and a plurality of openings extending through the support surface. Each opening is sized to receive a cover former and each has a cover former disposed therein. Each cover former has contacting portions and is sized to receive an article such as a potted plant which has an upper end, a lower end, and an outer peripheral surface.

The next step is moving each of the openings in sequence to a placing station. The next step comprises placing a sheet of material in a cover forming position over each of the openings when the opening is positioned at the placing station upon the support surface. The sheet of material, in the cover forming position, is positioned over the cover former in the opening. Each of the openings is moved in sequence from the placing station to a forming station with the sheet of material maintained in the cover forming position at the forming station.

In the next step, a potted plant is covered at the forming station with the sheet of material by positioning the potted plant in a position over the sheet of material and disposing the lower end of the pot generally above and near the portion of the sheet of material which is above the cover former. The pot is moved in a direction which causes the lower end of the pot to engage a portion of the sheet of material. The sheet of material is thereby caused to contact or nearly contact both the outer peripheral surface of the pot and the contacting portions of the cover former as the pot is moved. The sheet is pressed about the outer peripheral surface of the pot to form a cover about the pot. The cover has an inner surface facing the outer peripheral surface of the pot and an exposed outer surface facing outward.

Following this, each of the openings is moved in sequence from the forming station to a fastening station with the covered pot contained in the opening. A fastener is automatically applied about a portion of the outer surface of the covered pot for fastening the cover about the pot. Then, if a labeling assembly is included as a component of the apparatus each of the openings is moved in sequence from the fastening station to a labeling station with the covered pot maintained in the opening at the labeling station. A label is automatically applied to a portion of the outer surface of the covered pot for labeling the covered pot when the opening is positioned at the labeling station. Each of the openings is then moved with the covered article contained therein in sequence from the labeling station, when present, to a removal station. Finally, the covered pot is removed from the opening. Alternatively, the step of automatically applying a label may occur prior to the step of automatically applying a fastener.

Optionally, there may be an additional step of releasably securing the sheet of material in the cover forming position for generally immobilizing the sheet until after the sheet is moved to the forming position. In an alternative embodiment, the step of placing a sheet of material on the support surface may be performed automatically using an automatic sheet feeding assembly. Also, the step of forming a covered article may be performed automatically by using an automatic pick and place assembly to pick up an article and place it into the opening to form the covered article. Additionally, the step of removing the covered article may further comprise automatically removing the covered article from the opening of the platform.

The machine may be located on any axis and may be portable or stationary. The machine can use pre-cut sheets fed manually or automatically with a dispenser which feeds a sized sheet from a roll to the proper working position on the machine table. The fastening apparatus may also tie the knot on a radius or on a tangent to the object.

Embodiment of FIGS. 19–22

Figure 20:
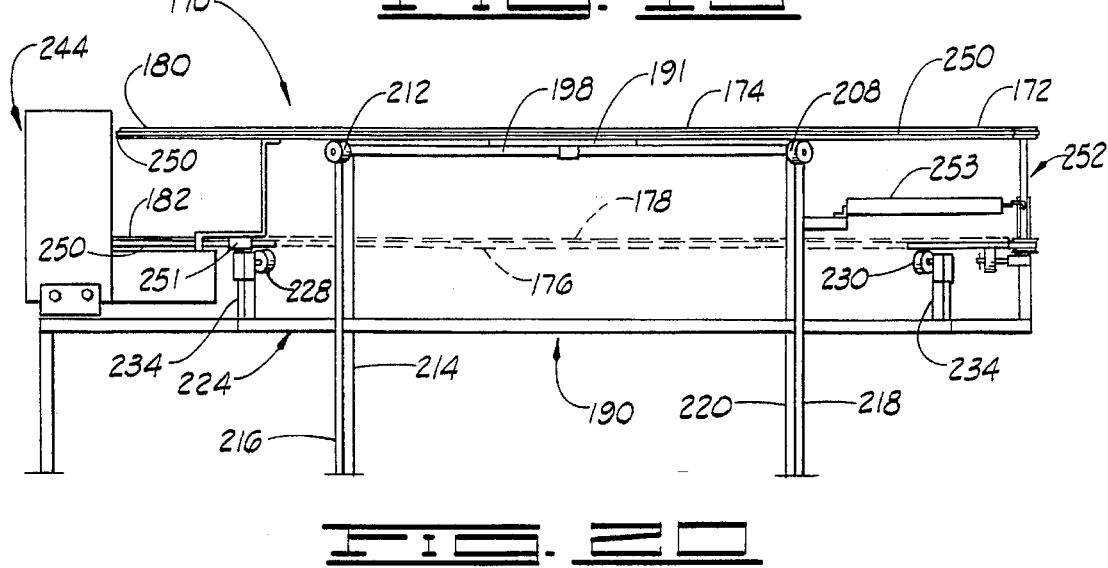
FIG. 20 is a side elevational view of the embodiment of FIG. 19.

Referring now to FIG. 19, one version of the apparatus designed in accordance with the present invention is designated by reference numeral 170. The rotary covering apparatus 170 comprises an upper support assembly 172 having an upper surface 174 and a lower support assembly 176 having an upper surface 178. The support assembly has an outer perimeter 180. The lower support assembly has an outer perimeter 182. The upper support assembly 172 has a plurality of openings 184 which extend through the upper surface 174. In the embodiment of FIGS. 19 and 20, there are five openings 184 (one being absent in FIG. 19 due to the cutaway view). Each opening 184 is spaced equidistant from the two openings 184 adjacent to it. The opening 184 are positioned near the outer edge 180 of the upper support assembly 172. Each opening has a diameter 186.

The upper support assembly 172 is rollingly supported by an upper roller assembly 190. A lazy Susan 191 is bolted to the under side of the upper support surface 174. The lazy Susan 191 is in turn bolted to a frame 192 of the upper roller assembly 190 having a first side 194, second side 196, a third side 198 and a fourth side 200, as shown in FIG. 19. The frame 192 also comprises a first diagonal member 202 and a second diagonal member 204. At one end of the diagonal member 202 is a first roller 206, and at the other end is a second roller 208. At one end of the diagonal member 204 is a third roller 210 and a fourth roller 212. The frame 192 is supported by a first leg 214, a second leg 216, a third leg 218 and a fourth leg 220. The upper support assembly 172 rests near its outer perimeter 180 upon the rollers 206–212 of the roller assembly 190 as shown in FIG. 20.

The lower support assembly 176 is supported by a lower roller assembly 222 comprising a base 224, a first roller 226, a second roller 228, a third roller 230 and a fourth roller 232. Each roller is supported on the base 224 by an armature 234. The lower support surface rotatingly rests upon the rollers 226–232 of the lower roller assembly 222. The upper support assembly 172 and the lower support assembly 176 are rotated synchronously, preferably in a counter clockwise direction. The rotation is driven by a drive mechanism which is described in more detail below.

Each opening 184 is sized to receive an article to be covered, such as a potted plant, as described above. The apparatus comprises a minimum of four stations for processing the article, such as the potted plant. The first station is a sheet feeding station designated generally by the reference numeral 240 in FIG. 19 and discussed in more detail below. The second station is an article placing and covering station and is designated generally by the reference number 242. The third station is an automatic fastening station which is designated generally by the reference numeral 244 and is described in more detail below. The fourth station is a removal station designated generally by the reference numeral 246. An additional (fifth) station, a labeling station, may also be included as a component of the invention and is designated in FIG. 19 generally by the reference numeral 248. When present, the labeling station 248 is positioned ahead of the removal station 246. In the preferred embodiment, discussed further below, the apparatus has these five stations, and an additional (sixth) station positioned after the placing/covering station and the fastening station for use as a second placing/covering station or for preparing the covered article prior to fastening the cover to the article. When a sixth station comprising a second placing/covering station is included, a second removal station, positioned after the first removal station 246, may be included in the apparatus.

A lazy Susan 191 is a commercially available plane bearing with its ball bearings located at its perimeter. The lazy Susan 191 supports the center of the upper support assembly 172 allowing it to rotate about its centerline, while keeping the centerline fixed. The rollers 206–212 provide support towards the outer perimeter 180.

The lower support assembly 176 and the upper support assembly 172 have attached about their outer perimeters 180 and 182, respectively, commercially available 'v' belt's 250. At least two positions about the perimeter 182 of the lower support assembly 176 there are located freely rotating, but fixed axis sheaves 251. The sheaves 251 are attached to the base 224 of the frame 192. At a third point on the outer perimeters 180 and 182 a drive assembly 252 is located. The drive assembly 252 is held in contact to the upper support assembly 172 and lower support assembly 176 by a spring 253 which is attached to the frame 192. Since the spring 253 is in tension, a force is applied to the lower support assembly 176 towards its centerline which holds the lower support assembly 176 in position against the sheaves 251. This design relies on the principle that 3 points equidistant radially about a desired point will define a circle perfectly centered about that point. Thus, by locating the contact points of the sheaves 251 and the lower support assembly 176 equidistant from the desired centerline concentricity of the upper support assembly 172 and lower support assembly 176 is assured.

Figure 21:
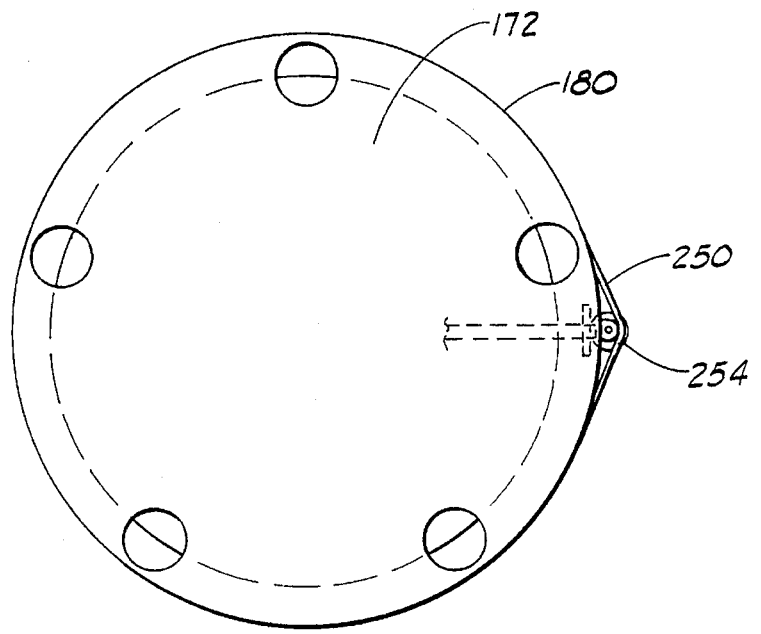
FIG. 21 is a plan view of one version of the drive assembly of the present invention.
Figure 22:
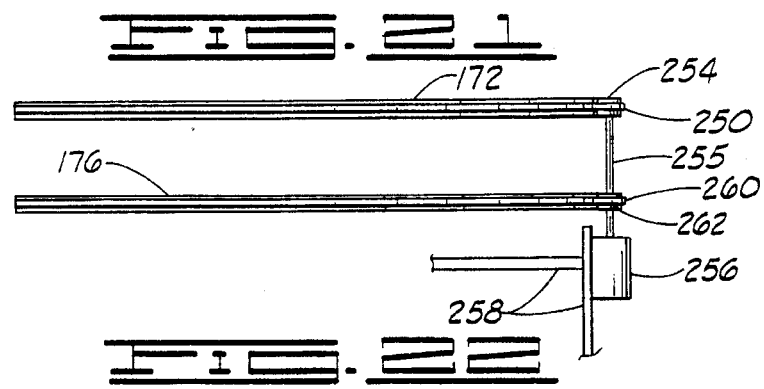
FIG. 22 is a side elevational view of the embodiment of FIG. 21.

Referring now to FIGS. 21–22, it will be observed that the upper support assembly 172 and the lower support assembly 176 are designed to move synchronously so that a portion of the upper surface 178 of the lower support assembly 176 which is located directly beneath a particular opening 184 remains beneath that same opening 184 through a complete rotation of the upper support assembly 172 and lower support assembly 176. In FIGS. 21 and 22 one version of the drive mechanism of the present invention is shown. A upper drive belt or chain 250 is disposed about the outer perimeter 180 of the upper support assembly 172. The drive belt 250 is disposed about an upper drive pulley 254 which is attached to a shaft 255 driven by a motor 256 which is supported by a support frame 258. A lower drive belt or chain 260 is disposed about the outer perimeter 182 of the lower support assembly 176. The lower drive belt 260 is disposed about a lower drive pulley 262 which is also connected to the drive shaft 255. When the motor 256 is actuated, the drive pulleys 254 and 262 both turn at the same rate, thereby pulling the drive belts 250 and 260 at the same rate, thereby causing the upper support assembly 172 and the lower support assembly 176 to move synchronously and at the same rate.

Figure 23:
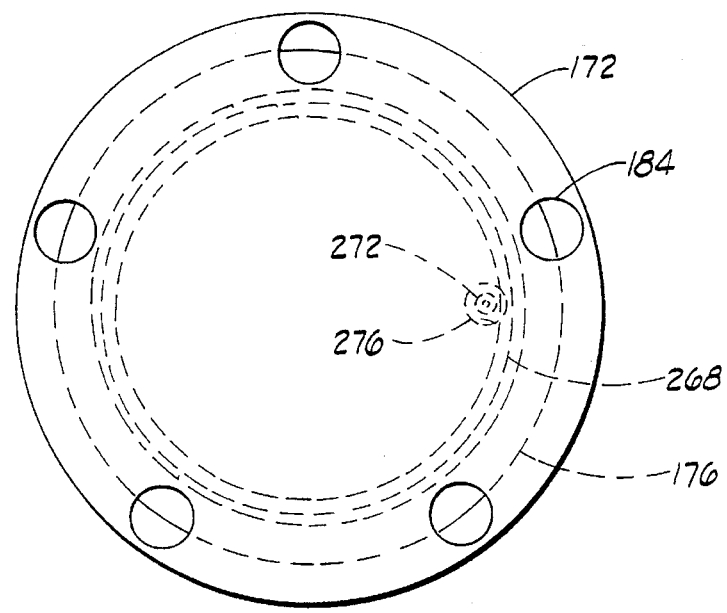
FIG. 23 is a plan view of another version of the drive assembly of the present invention.
Figure 24:
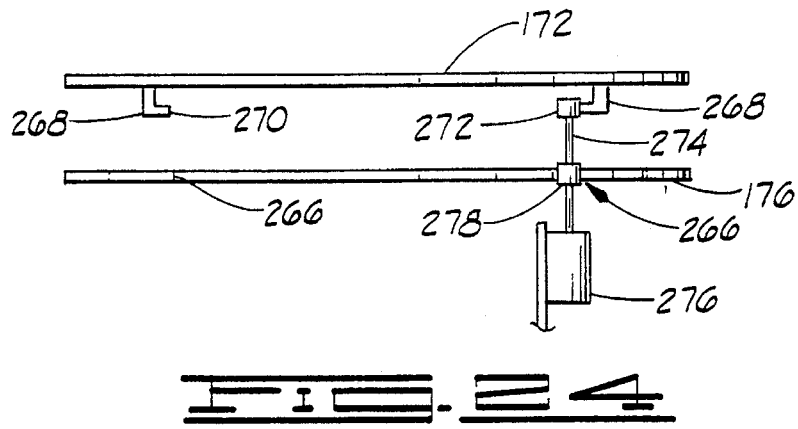
FIG. 24 is a side elevational view of the embodiment of FIG. 23.

Embodiments of FIGS. 23–24

In an alternative embodiment of the driving mechanism, a drive pulley may be positioned beneath the support assemblies 172 and 174 as shown in FIGS. 23 and 24. In this embodiment the lower support assembly 176 is a ring having an inner perimeter 266. The upper support assembly 172 has an inner drive ring 268 underneath the upper surface of the upper support assembly 172. The inner drive ring has an inner perimeter 270. A first drive pulley or gear 272 is positioned to contact a contacting surface of the inner perimeter 270 of the inner drive ring 268 and is connected to a drive shaft 274 which is connected to a motor 276. A second drive pulley or gear 278 is attached to the drive shaft 274 and is positioned to contact the inner perimeter 266 of the lower support assembly 176. When the motor 276 is actuated, the drive gears 272 and 278 both drive the upper and lower support assemblies 172 and 176 at the same rate thereby causing the upper assembly 172 and the lower assembly 176 to move synchronously.

Figure 25:
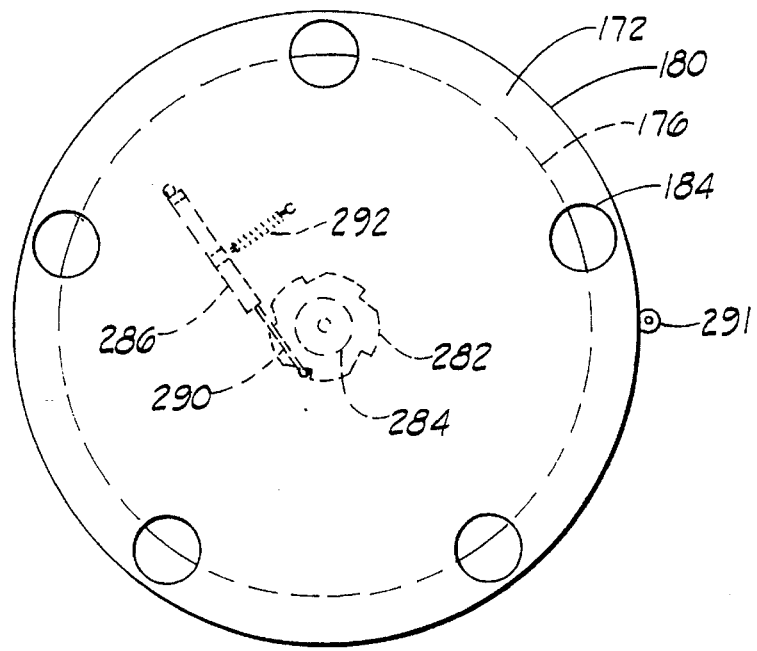
FIG. 25 is a plan view of yet another version of the drive means of the present invention.
Figure 26:
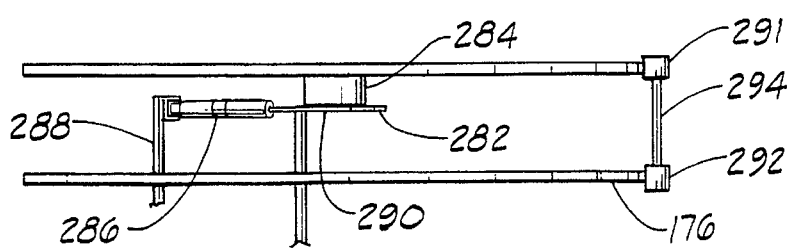
FIG. 26 is a side elevational view of the embodiment of FIG. 25.
Figure 27:
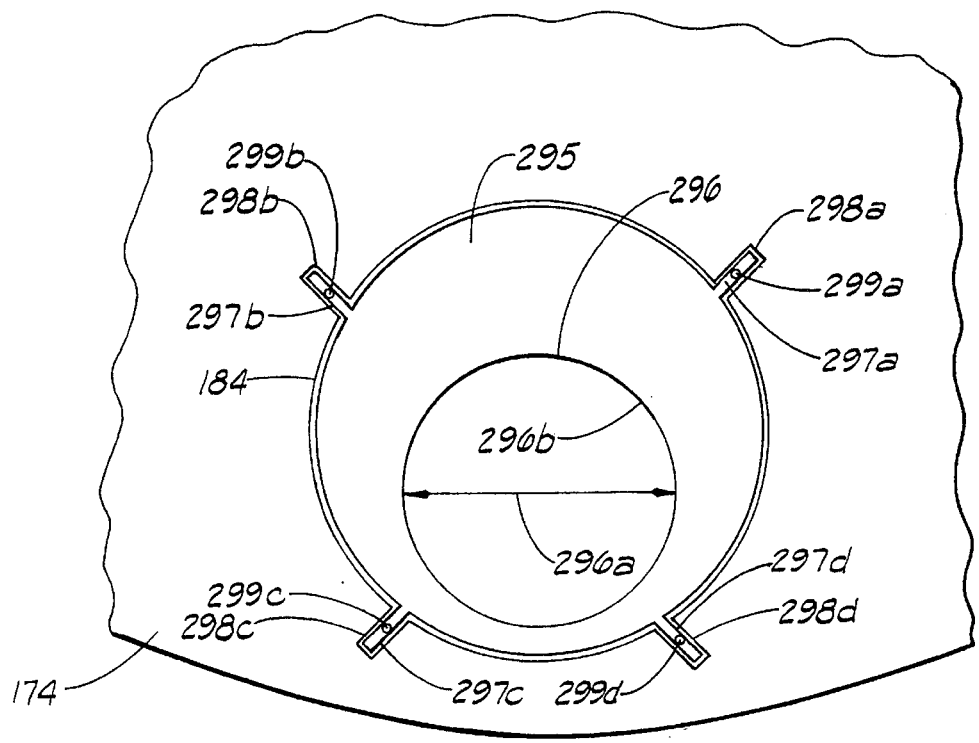
FIG. 27 is a plan view of a cover forming assembly of the present invention which applies a band below the upper support assembly.

Embodiments of FIGS. 25–27

In a second alternative embodiment of the driving mechanism, the rotation of the upper and lower support assemblies 172 and 176 may be driven by a hydraulic or pneumatic cylinder, as shown in FIGS. 25–26. A drive ratchet 282 is connected to the underside of the upper support assembly 172 by a drive ratchet attachment 284. A pneumatic or hydraulic cylinder 286 supported by a clevis mount 288 is equipped with a rod 290 which causes the drive ratchet 282 to rotate when the rod 290 is advanced. A spring 292 maintains tension on the cylinder 286 to maintain the end of the rod 290 in contact with the drive ratchet 282.

An upper roller 291 and a lower roller 292 are mounted upon a shaft 294 in a position such that the upper roller 291 rollingly engages the outer perimeter 180 of the upper support assembly 172 and the lower roller 292 rollingly engages the outer perimeter 182 of the lower support assembly 176. When drive ratchet 282 is advanced, causing the upper support assembly 172 to advance, the motion is transferred to the lower roller 292, via the upper roller 291 and shaft 294, causing the lower support assembly 176 to rotate at the same rate as the upper support assembly 172.

The embodiments of FIGS. 21–26 show only two mechanisms for causing the upper support assembly 172 and the lower support assembly 176 to move synchronously. Other mechanisms which cause the same result are also assumed to fall within the bounds of the present invention.

Referring again to FIGS. 19–20, the feeding station 240 comprises a manual feeding station in which sheets of material 10 are manually placed upon the upper support surface 174 generally over the opening 184 in the upper support surface 174. The sheets of material 10 may be obtained from a stack of sheets, or may be obtained from a sheet dispenser such as shown in FIGS. 10–12 and discussed above. In one alternate version of the invention, the sheet of material 10 may be automatically fed from a sheet feeding apparatus (not shown). Automatic sheet feeding devices are well known in the art. Examples of such sheet feeding machines are shown in U.S. Pat. Nos. 4,887,805 issued to Herbert et al., 4,889,331 issued to Sardella, and 5,090,676 issued to Matsumo et al. An automatic sheet feeding machine, if used, is detachably connected to the framework of the apparatus of the present invention.

In a preferred version of the invention, a cover former is detachably mounted in each opening 184. Shown in FIG. 27 is an eccentric ring-type cover former 295 which is detachably mounted within the opening 184 in the upper support surface 174. The former 295 has an opening 296 which has a diameter 296a and an inner perimeter 296b. In the preferred embodiment, the diameter 296a ranges from about 4 to about 9 inches.

The cover former 295 has extending therefrom four attachment flanges 297a–d. Each flange 297a–d is restingly disposed in a slot 298a–d, respectively, in the upper support surface 174, each slot 298a–d sized to receive each flange 297a–d respectively for supporting the cover former 295 within the opening 184. Each flange 297a–d may be secured in each slot 298a–d, respectively by screws 299a–d or other securing methods to ensure that the cover former 295 is not dislodged before, during or after the cover forming process.

Other examples of cover formers contemplated in accordance with the present invention are disclosed in U.S. Pat. No. 4,733,521 as discussed above.

The article or potted plant may be delivered to the placing/covering station 242 manually or automatically. When the operation is manual, a potted plant such as the potted plant 156 is disposed above the sheet of material and is pushed downward into the opening 154, through the cover former 295 disposed therein, forming a covered potted plant such as the covered potted plant 158.

Alternatively, the potted plant 156 may be deposited into the cover forming position by a pick and place machine (not shown) which is an apparatus for grasping an article from a plurality of stored articles, delivering the article to the correct position above the sheet of material 10 and then automatically depositing the article into the opening 184, and disengaging from the article once the article is deposited into the opening 184. Such pick and place machines are familiar to persons of ordinary skill in the art of object pickup and placement.

Embodiments of FIGS. 28–31

As shown in FIG. 1, a fastening station 244 serves to apply a fastener about the cover which has been applied about the article, such as a potted plant. Examples of fastening machines include tying machines such as those commercially available from Saxmeyer, Bunn, Felins, and Cyclops.

Figure 28:
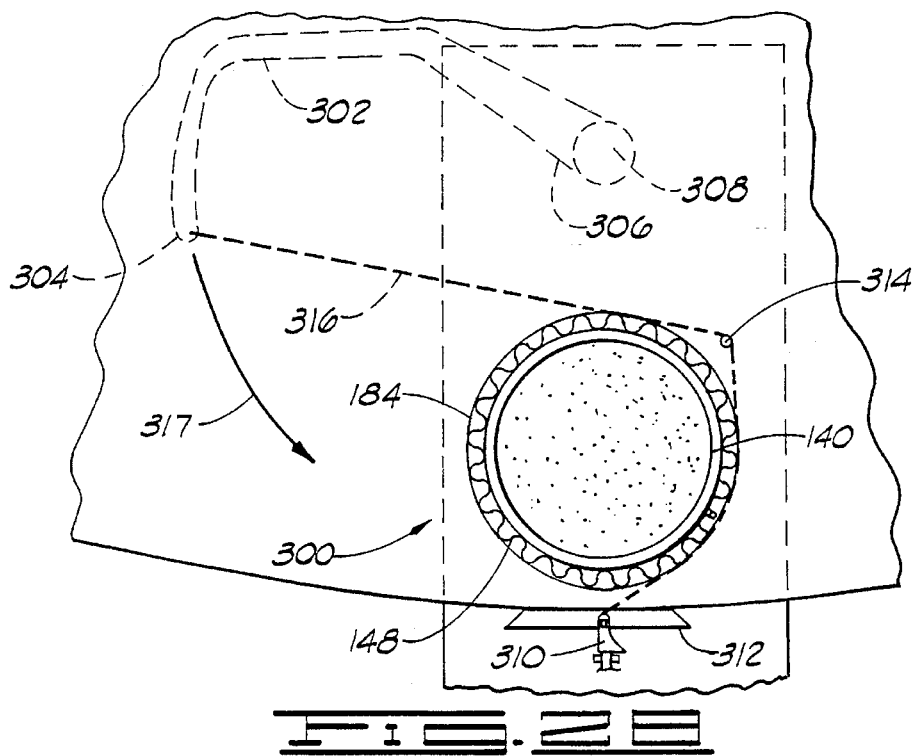
FIG. 28 is a plan view of a tying assembly of the present invention.

Referring now to FIG. 28, a fastening assembly is generally designated by the reference numeral 300. The fastening assembly 300 is mounted upon the framework 190 of the rotary covering apparatus 170.

Figure 29:
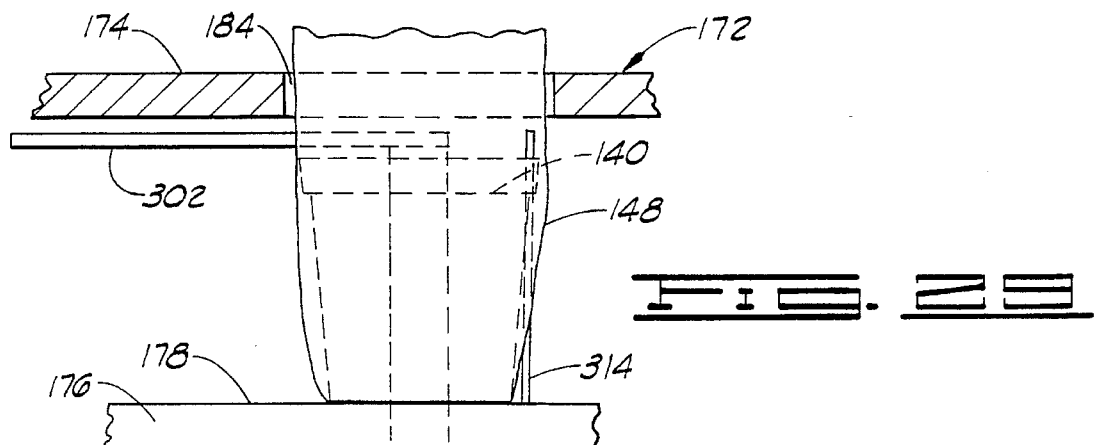
FIG. 29 is a side elevational view of the tying assembly of FIG. 28 as viewed from one angle.
Figure 30:
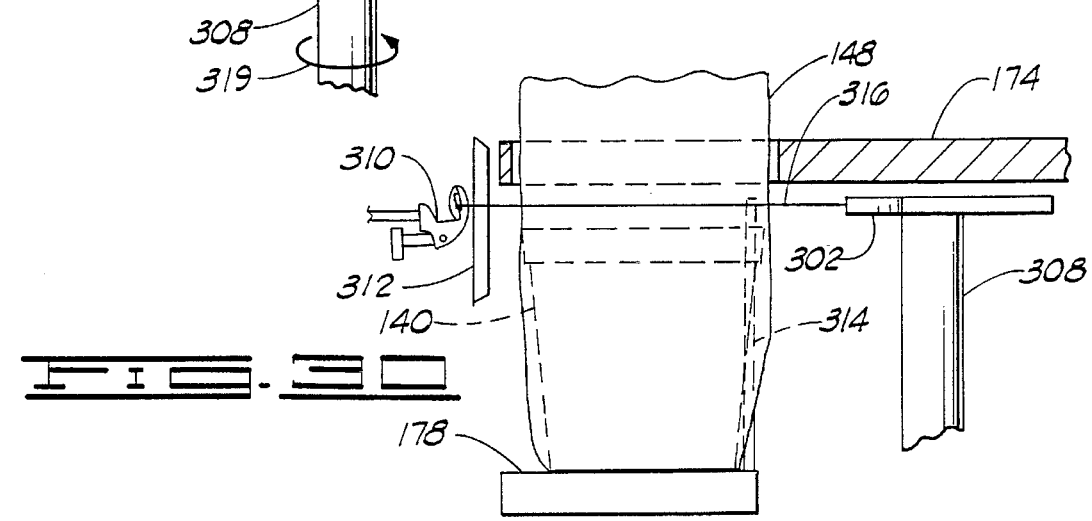
FIG. 30 is a side elevational view of the tying assembly of FIG. 29 as viewed from a second angle.

In the embodiment represented in FIGS. 28–30, the fastening assembly 300 is constructed to apply a fastener or band to the covered article in a plane beneath the upper support surface 174. The fastening assembly 300 comprises a tie arm 302 having a tie end and a pivot end 306, a tie arm shaft 308, a knotter head 310, a rocker plate 312 and a vertical rod 314 mounted to the lower support assembly 176. A string, tie, wire, or other type of band 316 is drawn through the knotter head 310 and engaged with the tie end 304 of the tie arm 302. The band 316 is looped outside of the vertical rod 314 as shown in FIG. 28 so that the stress of the band 316 upon the cover 148 is relieved so as not to tear the cover 148. The tie arm 302 is rotated by the tie arm shaft 308 in a direction 317 when the tie arm shaft is rotated in a direction 319 by a drive motor (not shown) of the fastening machine 300. The fastener or band 316 may be knotted with or without a bow or in any other manner which is feasible using the fastening machines described herein.

Embodiments of FIGS. 31–33

Referring now to FIGS. 31–33, an alternative fastening apparatus is generally designated by the reference numeral 300a. The fastening apparatus 300a is exactly the same as the apparatus 300 except that it is modified to apply the band 316 to the cover 148 in a plane above the upper support surface 174. A tie arm shaft 308a supports the tie arm 302a above the upper support surface 174. The band 316 is looped about a set of studs 318a–d which function to relieve the stress of the band 316 as it is applied about the cover 148. The studs 318a–d are reciprocatingly mounted upon the upper support assembly 172 so that the studs 318a–d can be retracted into the upper support assembly 172 to allow the band 316 to grasp the cover 148. The studs 318a–d can be controlled electrically, pneumatically, hydraulically or by another power source.

Referring again to FIG. 1 and the optional labeling station 248 represented therein, the labeling apparatus (not shown) is a separate unit which can be mounted and removed from the main frame 190 of the rotary covering apparatus 170. Such labeling devices are known by persons of ordinary skill in the label applying art and are commercially available. The label (not shown) is applied to the side of the covered potted plant 158 before the band 316 is applied about the cover 148. The label may be an adhesive label or may be applied as an ink jet, or even by stamping.

The removal station 246 preferably comprises manual removal of the fastened covered potted plant from the opening 184.

Figure 34:
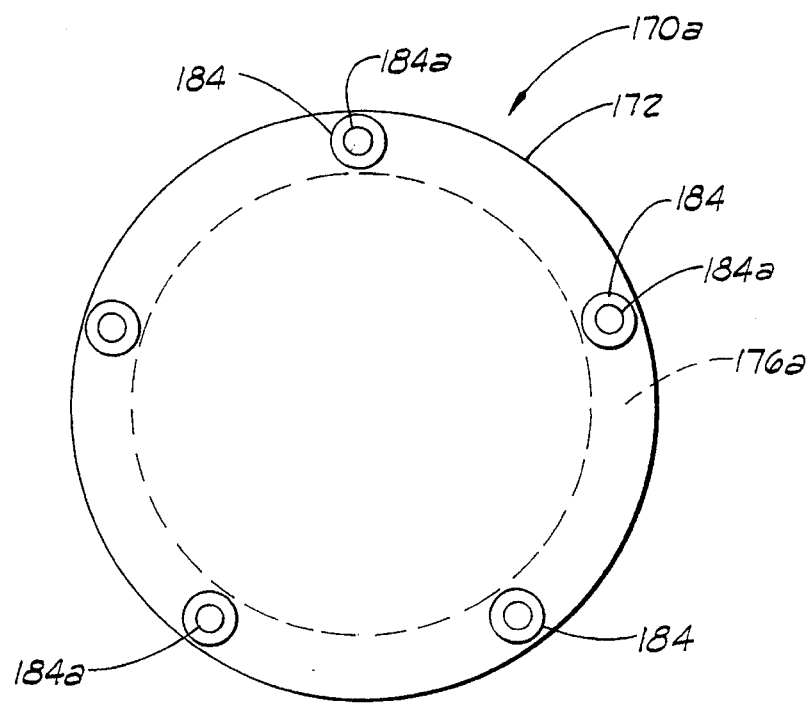
FIG. 34 is a plan view of a version of the present invention in which lower support assembly has holes which correspond to those of the upper support assembly.

Referring now to FIG. 34, a rotary covering apparatus exactly like the apparatus 170 is designated by the reference numeral 170a. The rotary covering apparatus 170a comprises a lower support assembly 176a which has an opening 184a disposed therein below each opening 184 in the upper support assembly 172. When a covered potted plant (not shown) is disposed within each opening 184, the opening 184a provides access to the bottom of the covered potted plant from beneath the lower support assembly 176a.

This accessibility can be utilized to apply a label to the bottom of the cover when the covered potted plant is at the labeling station 248. Or this accessibility can be utilized to push the covered potted plant manually or automatically vertically causing the top of the covered potted plant to be more easily grasped and therefore more easily removed manually or automatically from the opening 184.

Figure 37:
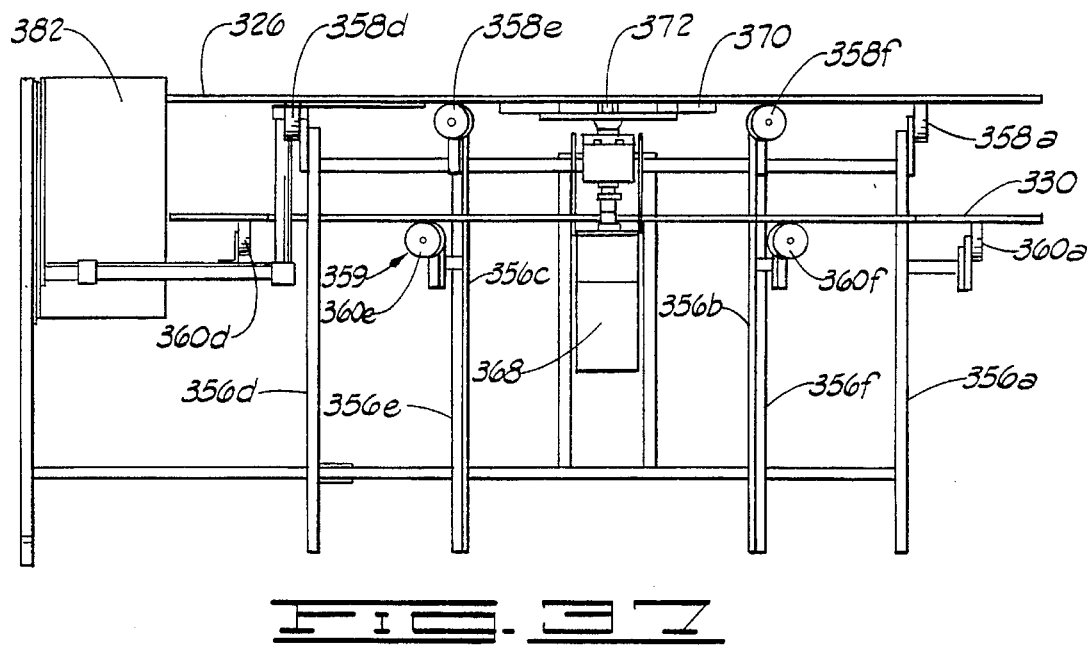
FIG. 37 is another side elevational view of the embodiment of FIG. 36.

Embodiment of FIGS. 35–37

Referring now to FIGS. 35 and 36, another version of the rotary covering apparatus constructed in accordance with the present invention is generally designated by the reference numeral 324. The rotary covering apparatus comprises an upper support assembly 326 having an upper surface 328, and a lower support assembly 330 having an upper surface 332 (FIG. 36). The upper support assembly 326 has an outer perimeter 334 and the lower support assembly 330 has an outer perimeter 336 and an inner perimeter 338. The upper support assembly 326 has six openings 340 which pass through the upper support assembly 326 and which are positioned equally spaced near the outer perimeter 336 of the upper surface 328 as shown in FIG. 35. The lower support assembly 330 has a number of openings 342 equal in number to the number of openings 340 in the upper support assembly 326. It will be understood by one of ordinary skill in the art that the rotary cover apparatus could be modified to accommodate fewer than six or more than six openings 340. Each opening 340 has a diameter 344 and each opening 342 has a diameter 346. Each opening 342 is positioned, in operation, below a corresponding opening 340. Each opening 340 is sized to receive an article such as a potted plant, as described above. Each opening 340 has mounted therein a cover former (not shown) such as described previously.

The upper support assembly 326 is rollingly supported by an upper roller assembly 348 which comprises a framework 350 having side bars 352a–f, as shown in FIG. 35. The frame 350 also comprises diagonal cross bars 354a–f. The frame 350 is supported by legs 356a–f (FIG. 37). At one end of each diagonal cross bar 354a–f is attached a roller 358a–f, respectively. The upper support assembly 326 rests upon the rollers 358*a–f* and is mobile upon the roller assembly 348 when the upper support assembly 326 is driven by a driving force of the roller assembly 348 as shown in FIG. 35.

The lower support assembly 330 is supported by a lower roller assembly 359 comprising rollers 360*a–f* mounted to upper portions of the legs 356*a–f*, respectively. The lower support surface rotatingly rests upon the rollers 360*a–f* of the lower roller assembly 359. The upper support assembly 326 and the lower support assembly 330 are rotated synchronously, preferably in a counter clockwise direction. The rotation is driven by a drive mechanism such as a motor. The upper support assembly 326 and the lower support assembly 330 are made to move synchronously, at the same rate, by a plurality of pins 362*a–f* (FIGS. 35–36), each of which has one end engaged with the upper support assembly 326 and the other end engaged with the lower support assembly 330, as shown by pins 362*c* and 362*f* in FIG. 36.

The upper support assembly 326 is driven by a Geneva-type drive disc 364 mounted upon a drive axle 366 which is attached to a motor 368. A star wheel 370 is mounted on the underside of the upper support assembly 326 as indicated in FIGS. 35–37 and revolves about a fixed shaft 372. When the Geneva drive assembly 364 is driven in direction 371, a roller pin (not shown) on the drive disc 364 engages a slot on the star wheel 370 and turns the star wheel 370 until the roller pin emerges at the opposite tangent point. This is the index portion of the cycle. This in turn causes rotation of the upper support assembly 326 about a turn axle 372. The upper support assembly 326 is caused to rotate both upon the roller assembly 348 and the lower support assembly 330, by virtue of its connections to the upper support assembly 326 via connecting pins 362*a–f*, is caused to rotate upon the lower roller assembly 359.

The cam disc 364 has a contoured surface which clears the points of the star wheel 370 during the index phase and matches the concave curve surface on the star wheel 370 between the points on the star wheel 370. This causes the star wheel 370 to be locked during the dwell portion of the cycle (as shown in FIG. 35, index =⅓ and dwell =⅔ of the total cycle approximately). The star wheel 370 has radial slots equal to the number of indexes or positions in one complete revolution of the upper support assembly 326.

The rotation of the rotary covering apparatus 324 is controlled by an electrical control assembly (not shown) which can be manually or automatically controlled. Push buttons 374*a–d* are distributed about the periphery of the apparatus 324 for manual control. It will be understood by one of ordinary skill in the art that the Geneva drive is only one type of drive which may be employed.

The rotary covering apparatus 326 comprises six operational stations. The sheet feeding station 376 and the placing/covering station 378 are similar to such stations described above. The arranging station 380 is a manually operated post in which the operator can arrange the cover 148 about the potted plant prior to the fastening step. This arranging step is optional. This arranging station may alternatively be an additional placing/covering station like the station 378. The fastening station 382 is similar to the fastening station described previously. A labeling station 384 can be equipped with a labeling apparatus (not shown). The labeling step is optional and when not needed the labeling station 384 can be left vacant. Due to the accessibility from underneath the covered potted plant through an opening 342, the label can be applied to the bottom of the covered potted plant. If this station 384 is not in use, the covered potted plant is not labelled. A removal station 386 comprises the site at which the covered potted plant is removed from the rotary covering apparatus 326. In the embodiment of FIGS. 35–37, the covered potted plant is manually removed from the opening 340.

Figure 38:
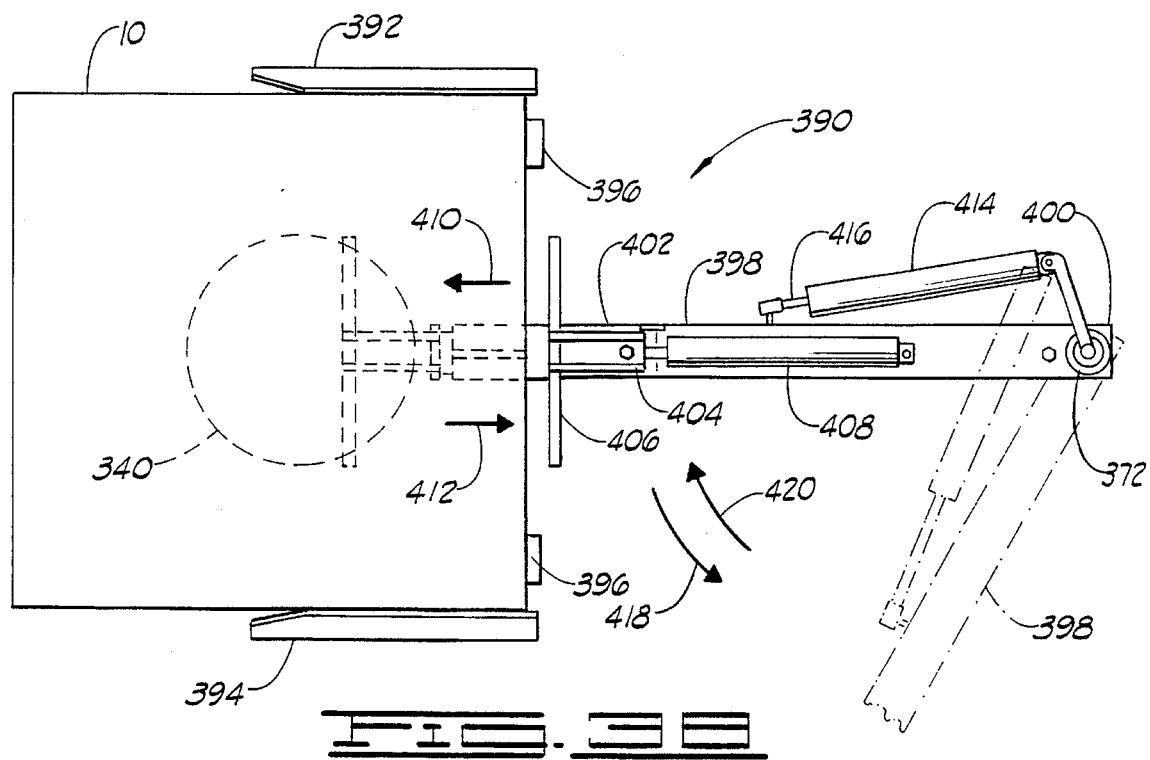
FIG. 38 is a plan view of a version of the sheet clamping assembly of the present invention.

Embodiment of FIG. 38

The rotary covering apparatus 326 may be modified to further comprise a sheet clamping assembly 390. The sheet clamping assembly 390 functions to clamp down upon the sheet of material 10 after it has been disposed over the opening 340 at the sheet feeding station 376. The sheet of material 10 is fed onto the upper support surface 328 adjacent a pair of guides 392 and 394. Pairs of guides identical to guides 392 and 394 flank each opening 340 on the upper support assembly 326. The position of the sheet of material 10 is further constrained by one or more stoppers 396 which cause the movement of the sheet 10 to be stopped at a predetermined position on the upper support surface 328. The guides 392 and 394 and the stoppers 396 are adjustable.

Comprising the sheet clamping assembly 390 is an armature 398 having a first end 400 and a second end 402. The first end 400 is connected to the turn axle 372 and the second end 402 is oriented in a direction toward the sheet feeding station 376. Attached to the armature 398 is a reciprocating clamp 404 having a clamp head 406 and a piston assembly 408 for extending and retracting the clamp head 406. The clamp head 406 can be extended in direction 410 into a clamping position wherein the clamp head 406 is pressed firmly upon the sheet 10 and thereby causes the sheet 10 to resist being dislodged when the upper support assembly 326 is rotated during operation.

The armature 398 is equipped with a cylinder 414. When the rod 416 of the cylinder 414 is extended, the armature 398 is caused to rotate in direction 418 so the sheet 10 is securely clamped while the sheet 10 is being moved to the placing and covering station 378. Once the sheet 10 is at the placing/covering station 378, the piston assembly 408 retracts the clamp head 406 in direction 412 to a storage position, and the cylinder 414 retracts the rod 416 causing the armature 398 to return in direction 420 to the original position in readiness to clamp upon another sheet.

Figure 39:
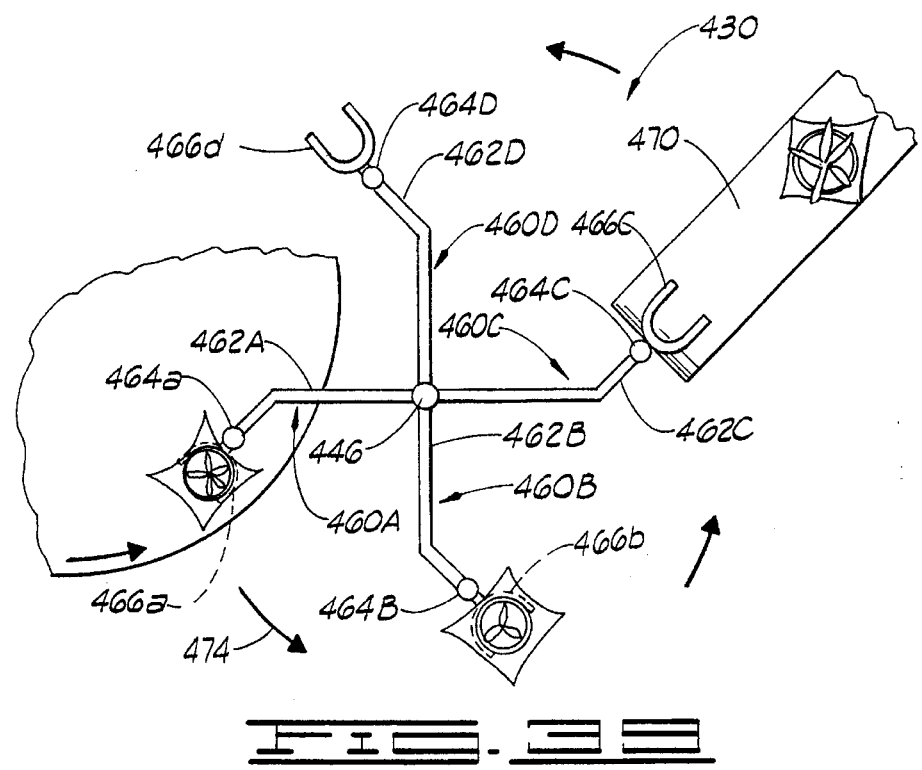
FIG. 39 is a plan view of a pick and place machine for removing processed articles.
Figure 40:
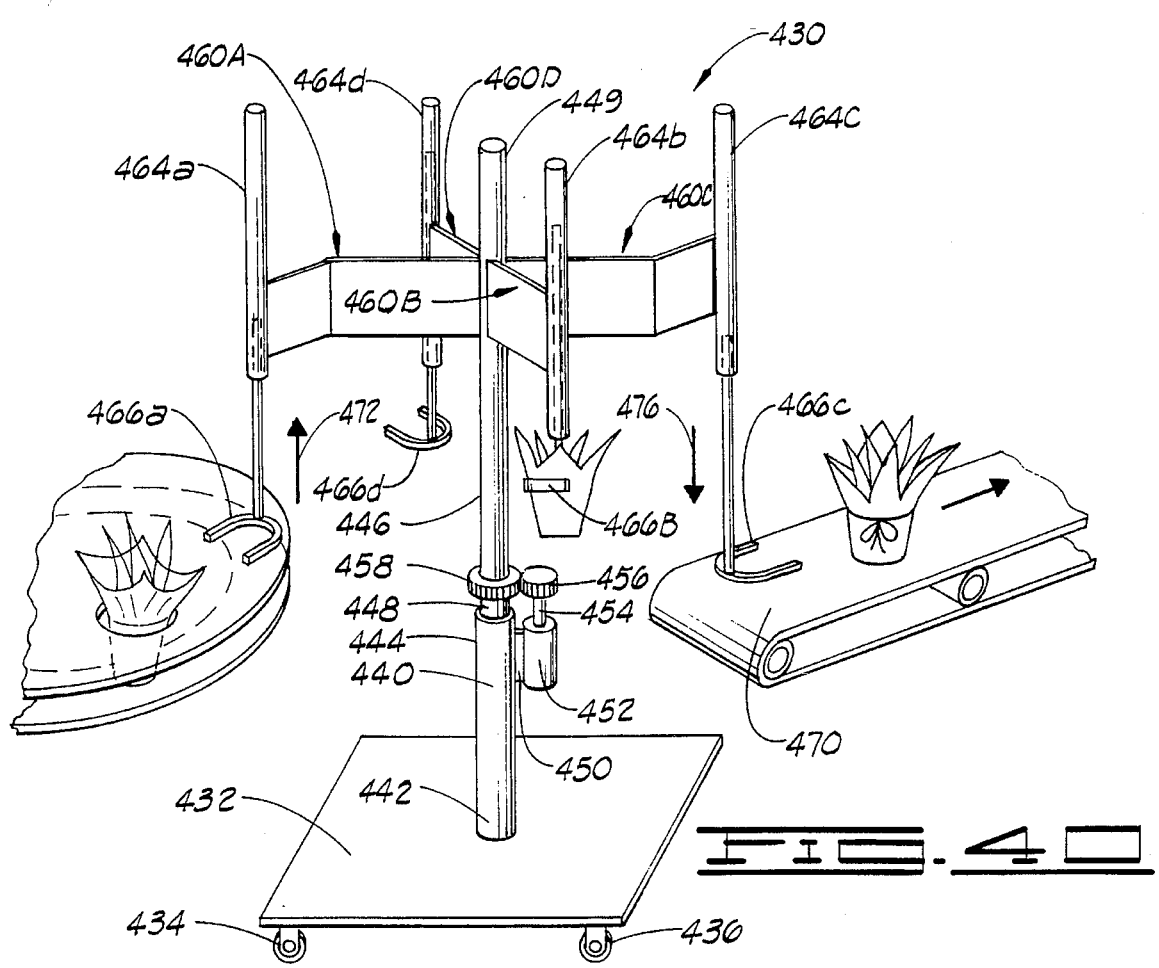
FIG. 40 is a side perspective view of the pick and place machine of FIG. 39.

Embodiment of FIGS. 39–40

In an alternate embodiment of the rotary covering apparatus 324, the removal station 386 may further comprise an automatic pick and place assembly such as that designated generally by the reference numeral 430 in FIGS. 39 and 40. The pick and place assembly 430 comprises a platform 432 which may have a first pair of locking casters 434 and a second pair of locking casters 436, thus the assembly 430 may be moved aside and replaced at the removal station 386 by a manual operator for removal of covered potted plants 158 when an automated system is not used.

The assembly 430 further comprises a conduit 440 with a first end 442 and a second end 444. The first end 442 is secured to the platform 432. The assembly 430 has an axle 446 which has a first end 448 and a second end 449. The second end 444 of the conduit 440 is open for accepting first end 448 of the axle 446. The diameter of the first end 448 of the axle 446 is slightly less than the diameter of the lumen (not shown) in the conduit 440. This allows the axle 446 to rotate freely within the conduit 440.

A drive assembly mount 450 is secured near the second end 444 of the conduit 440. Secured to the drive assembly mount 450 is a drive assembly 452 with a rotatable shaft 454. Secured to the rotatable shaft 454 is a first gear 456. A second gear 458 is secured to the axle 446 between the first end 448 and the second end 449 thereof, and in a position such that the first gear 456 and second gear 458 are meshingly engaged.

Secured near the second end 449 of the axle 446 are four transfer assemblies 460A, 460B, 460C and 460D. Each transfer assembly 460A–460D includes, a brace 462a–462d attached to the turnstile axle 446, a cylinder 464a–464d, and a carriage 466a–d attached to a rod of the cylinders 464a–464d, respectively. Each cylinder 464a–464d is adapted to reciprocatingly raise and lower each carriage 466a–d, respectively. A conveyor 470 may be disposed in a position to receive a covered potted plant 158 from one of the carriages 466a–d for delivering the covered potted plant 158 to a storage area (not shown).

Figure 41:
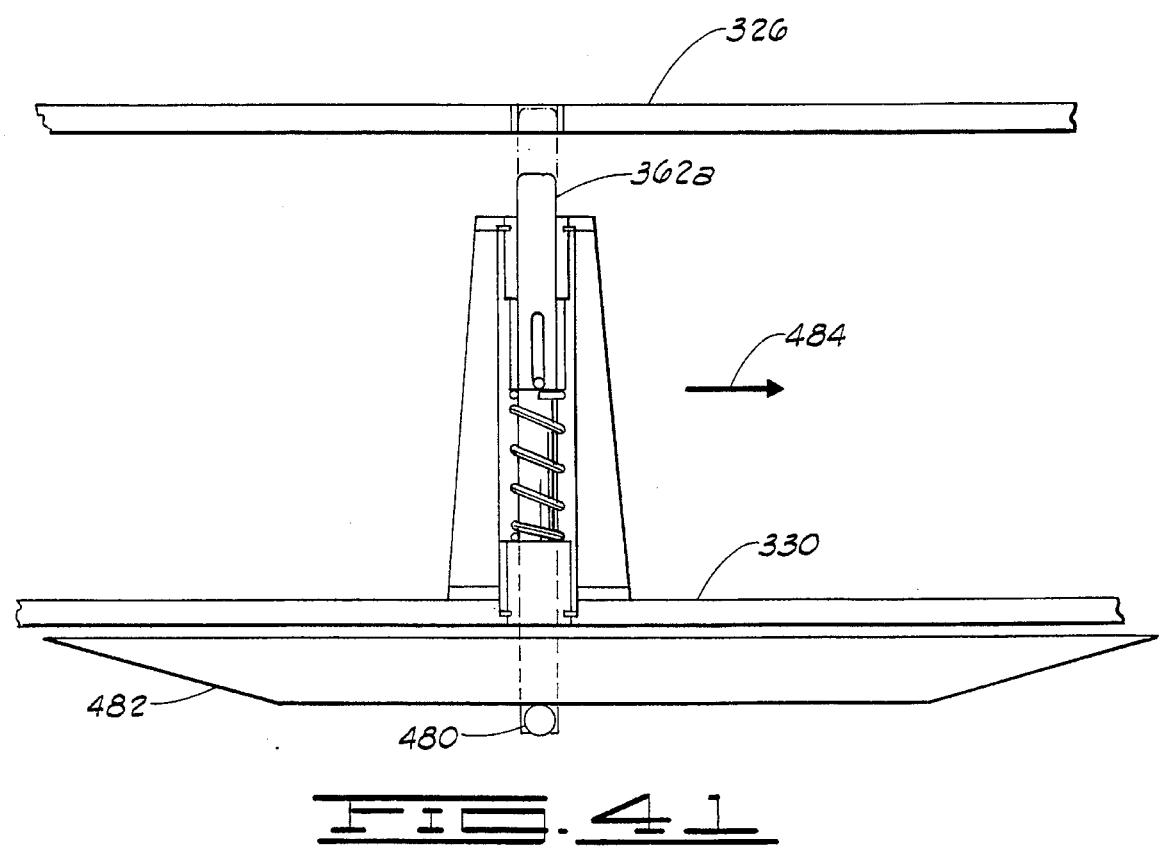
FIG. 41 is a side view of a cam assembly for retracting a positioning pin.

Embodiments of FIGS. 41–42

Rollers 358a–f and 360a–f are free turning and serve to maintain a planar orientation for the upper support assembly 326 and the lower support assembly 330. This enables the thickness of the upper support assembly 326 and the lower support assembly 330 to be kept to about ⅜" without causing waving or drooping of the assembly and reduces the circumferential inertia which becomes a critical factor due to the starting and stopping motion of the indexing process as openings are advanced.

Upper support assembly 326 and lower support assembly 330 are synchronized by the same number of pins 362a–f as holes in the upper support 326. When fastening occurs below the upper support assembly 326 (e.g. in the version shown in FIGS. 28–30), each pin (362a–f) must be lowered as it passes the fastening station to clear the fastening device. One preferred mechanism for accomplishing this is shown in FIG. 41. A cam follower 480 positioned on the bottom end of the pin 362a (or 362b–f) rides under a linear cam 482 pulling pin 362a down a predetermined distance (e.g. 1.25 inches) as the cam follower 480 passes in direction 484 through the fastening station thereby clearing the fastener 316. The pin 362a is then moved back into the engaging position in the upper support assembly when the cam follower 480 runs past the terminal end of cam 482. Meanwhile, each of the other 3–5 pins 362b–f maintain centering of the support assemblies and synchronization of movement. The linear cam 482 can be mounted on an angle bracket outboard of roller 360d (FIG. 37) for example.

A preferred embodiment of the present invention comprises a pot support assembly shown in FIG. 42 and designated by the general reference numeral 488. A pot support assembly 488 is disposed below each opening 340 in the upper support assembly 326. The pot support assembly 488 comprises a support ring 490, a base 492 and a plurality of ring supports 494 attaching the support ring 490 to the base 492. A cam follower 496 comprising a bar 498 having an upper end 500 and a lower roller end 502 is attached to the base 492 at the upper end 500 and further comprises the pot support assembly 488. The base 492 is able to move reciprocatingly up and down guided by a plurality of guide rods 504, thereby enabling the reciprocating upward and downward movement of the support ring 490. The cam follower 496 projects through the opening 342 in the lower support assembly 330 or through another opening in the lower support assembly 330.

A cam 506 is stationarily mounted at the removal station 386 and functions to cause the elevation of the covered potted plant above the level of the upper support assembly 326 for facilitating the removal of the covered potted plant. The cam 506 has a first end 508, a peak 510, a second end 512, an inclining surface 514 and a declining surface 516. During operation, the upper support assembly 326 and the lower support assembly 330 synchronously rotate carrying the pot support assembly 488 and the pot 140 disposed thereupon. As the pot support assembly 488 approaches the removal station 386, the roller end 502 of the cam follower 496 contacts the cam 506 and raises the support ring 490 as the roller end 502 advances on the inclining surface 514 in direction 520. When the roller end 502 of the cam follower 496 reaches the peak 510 of the cam 506, the pot 140 is extended a predetermined distance above the upper support assembly 326 (as indicated in FIG. 42). Removal of the pot 140 is thereby facilitated. After the pot 140 has been removed, the roller end 502 advances along the declining surface 516 of the cam 506 and thereby brings the pot support assembly 488 into a position to receive another pot 140.

In Operation

In operation, the present invention comprises providing a rotary covering apparatus such as the one designated by the reference numeral 324 in FIG. 35. In the first operational step, the upper support assembly 326 is advanced so that a vacant opening 340 is positioned at the sheet feeding station 376. There, a sheet of material 10 is placed on the upper support surface 328 in a cover forming position over the opening 340 wherein the sheet 10 is positioned between a pair of guides 392 and 394 and advanced until reaching a stopper 396. There placed, the sheet of material 10 is positioned over the cover former 295 mounted within the opening 340. In the preferred embodiment, the sheet of material 10 is immobilized by the sheet clamping assembly 390 for securing the sheet of material 10 during the movement of the upper support assembly 326 to the next station.

In the next step, the opening 340 with the sheet 10 clamped thereover is rotated to a forming position at the placing/covering station 378. The clamp 406 is retracted and the clamping assembly 390 is repositioned to the sheet feeding station 376. Next, the article, or in the preferred embodiment a pot 140 containing a plant is removed from a storage position near the station 378. The pot 140 is positioned over the sheet of material 10 the potted plant is disposed generally above and near the portion of the sheet of material 10 which is above the cover former 295 mounted in the opening 340. Then, the pot 140 is moved in a direction through the cover former 295 toward the lower support assembly 330 which causes the lower end 142 of the pot 140 to engage a portion of the sheet of material 10. The pot 140 and portions of the sheet of material 10 pass through the cover former 295 causing the sheet of material 10 to contact or nearly contact both the outer peripheral surface 144 of the pot 140 and the contacting portions of the inner perimeter 296b of the cover former 295. The sheet 10 is thereby pressed about the outer peripheral surface 144 of the pot 140 thereby forming a cover 148 about the pot 140 and retaining the covered pot 140 in the opening 340. The pot 140 is advanced through the cover former 295 opening until the lower end 142 of the pot 140 rests on or nearly rests on the upper surface 332 of the lower support assembly 330 or on a pot support assembly 488 such as shown in FIG. 42. The step of picking up a pot 140 from a potted plant supply and placing the pot 140 in the opening 340 may be done automatically by a pick and place machine (not shown).

The upper support assembly 326 is next rotated so that the opening 340 containing the covered potted plant 158 is advanced into a fastening position at the fastening station 382. At the fastening station 382 a band or fastener 316 is automatically applied about a portion of the outer surface 150 of the cover 148 of the covered potted plant 158 by the tying apparatus whereby the cover 148 is fasteningly secured about the pot 140. In the next step, the upper support assembly 326 is rotated so that the opening 340 containing the covered potted plant 158 which is now fastened by fastener 316 is moved to a removal station 386 where the covered potted plant 158 is removed manually or automatically from the upper support assembly 326.

The method may comprise the optional step of advancing the opening 340 containing the covered potted plant 158 to an arranging station 380 where an operator may manually arrange portions of the cover 148 and the exposed portions of the plant so that the cover 148 and potted plant are attractively and optimally arranged prior to advancement of the opening 340 to the fastening station 382.

The method may also comprise the additional step of rotating the upper support assembly 326 so the opening 340 containing the covered potted plant 158 is advanced to a labeling station 384 engaging an automatic labeling device (not shown) wherein a label (not shown) is automatically applied to a portion of the outer surface 150 of the cover 148 of the pot 140. The label may be applied to the outer peripheral surface 150 of the cover 148 or the label may be applied to the bottom (not shown) of the cover 148 through the opening 342 in the lower support assembly 330.

The method may also comprise the step of causing the elevation of the pot 140 a distance above the upper support assembly 326 for easier removal of the pot 140 at the removal station 386.

The method may comprise the additional step of using an automatic pick and place assembly 430 at the removal station 386 for automatically removing the covered potted plant 158 from the opening 340. When the covered potted plant 158 approaches the removal station 386, the pick and place assembly 430 is in position to accept the covered potted plant 158. As soon as the covered potted plant 158 has been securely engaged by one of the carriages of the pick and place assembly 430, for example, carriage 466a, the carriage 466a and the covered potted plant 158 carried thereby are raised by cylinder 464a in a direction 472 and carried in direction 474 as the axle 446 turns in a counter clockwise direction (FIGS. 39–40).

When the transfer assembly 460a is in a position over the conveyor 470 the carriage 466a is lowered by cylinder 464a and lowers the covered potted plant 158 in direction 476 onto the conveyor 470 which carries the covered potted plant 158 to a storage or packing location (not shown).

Changes may be made in the construction and the operation of the various components, elements and assemblies described herein or in the steps or the sequence of steps of the methods described herein without departing from the spirit and scope of the invention as defined in the following claims.

What is claimed is:

1. An apparatus for fastening a cover to an article, comprising:

a first rotatable platform having a support surface formed thereon and having one or more openings extending through the support surface, the support surface adapted to support at least portions of a sheet of material in a position generally over each opening;

a second rotatable platform for supporting a covered article passed through an opening in the first platform, the second rotatable platform disposed below the first rotatable platform and rotatable in registry with the first rotatable platform;

a framework for supporting the first and second rotatable platforms;

a cover forming means disposed in the opening in the support surface of the first rotatable platform, the cover forming means having contacting portions for contacting the sheet of the material, the opening and the cover forming means adapted for receiving an article having an upper end, a lower end, and an outer peripheral surface such that when the article is moved toward the opening the lower end of the article is caused to engage a portion of the sheet of material disposed over the cover forming means in the opening, the article and portions of the sheet of material thus passing through the cover forming means causing the sheet of material to engage the outer peripheral surface of the article and the contacting portions of the cover forming means as the article is moved wherein portions of the sheet contactingly engage or nearly engage the outer peripheral surface of the article thereby forming a covered article, the cover of the covered article having an inner surface facing the outer peripheral surface of the article and an exposed outer surface;

means for controllably rotating the first rotatable platform and the second rotatable platform; and means for automatically applying a fastener about a portion of the outer surface of the covered article for fastening the cover about the article when the covered article is rotated into a fastening position.

2. The apparatus of claim 1 further comprising means for automatically applying a label to a portion of the outer surface of the cover of the covered article when the platform is rotated such that the opening containing the covered article is moved into a labeling position.

3. The apparatus of claim 1 further comprising means for automatically elevating the covered article through the opening in the first rotatable platform as the covered article approaches a removal station.

4. The apparatus of claim 1 wherein the fastener is applied to a portion of the covered article positioned above the first rotatable platform.

5. The apparatus of the claim 1 wherein the fastener is applied to a portion of the covered article positioned below the first rotatable platform and above the second rotatable platform.

6. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

applying a fastener about at least a portion of the cover for cooperating to hold the cover about the pot means;

moving the platform to a removal station to position the pot means for removal from the platform; and removing the pot means by vertically lifting the pot means and the cover from the platform at the removal station.

7. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

automatically applying a fastener about at least a portion of the cover for cooperating to hold the cover about the pot means;

moving the platform to a removal station to position the pot means for removal from the platform; and removing the pot means by vertically lifting the pot means and the cover from the platform at the removal station.

8. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

applying a fastener about at least a portion of the cover for cooperating to hold the cover about the pot means;

moving the platform to a labeling station to position the pot means for application of a label;

applying a label to the cover of the pot means;

moving the platform to a removal station to position the pot means for removal from the platform; and removing the pot means by vertically lifting the pot means and the cover from the platform at the removal station.

9. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

automatically applying a fastener about at least a portion of the cover for cooperating to hold the cover about the pot means;

moving the platform to a labeling station to position the pot means for application of a label;

applying a label to the cover of the pot means;

moving the platform to a removal station to position the pot means for removal from the platform; and removing the pot means by vertically lifting the pot means and the cover from the platform at the removal station.

10. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

applying a fastener about at least a portion of the cover for cooperating to hold the cover about the pot means;

moving the platform to a labeling station to position the pot means for application of a label;

automatically applying a label to the cover of the pot means;

moving the platform to a removal station to position the pot means for removal from the platform; and removing the pot means by vertically lifting the pot means and the cover from the platform at the removal station.

11. A method for forming a sheet of material about at least a portion of a pot means having an outer peripheral surface to provide a decorative covering for the pot means, the pot means having a botanical item disposed therein, the method comprising:

providing a platform;

providing cover forming means adapted to form the sheet of material about at least a portion of the outer peripheral surface of a pot means;

placing the sheet of material on the platform at a material positioning station of the platform;

moving the platform to position the sheet of material and the platform at a forming station;

providing the pot means;

utilizing the cover forming means at the forming station to form the sheet of material into a cover extending about at least the portion of the outer peripheral surface of the pot means, the pot means carried by the platform;

moving the platform to a fastener station to position the pot means for application of a fastener about the cover;

automatically applying a fastener about at least a portion of the cover for cooperating to hold the cover about the pot means;

moving the platform to a labeling station to position the pot means for application of a label;

automatically applying a label to the cover of the pot means;

moving the platform to a removal station to position the pot means for removal from the platform; and removing the pot means by vertically lifting the pot means and the cover from the platform at the removal station.

12. The method of any one of claims 6, 7, 8, 9, 10 or 11 wherein in the step of placing the sheet of material, the material further comprises a material selected from a group of materials consisting of paper, metal foil, cloth (natural or synthetic), denim, burlap or polymer film or combinations thereof.

13. The method of any one of claims 6, 7, 8, 9, 10, or 11 wherein in the step of providing the article, the article is further defined as a flower pot containing a botanical item therein.

14. The method of any one of claims 6, 7, 8, 9, 10 or 11 wherein the step of placing the sheet of material is performed automatically.

15. The method of any one of claims 6, 7, 8, 9, 10 or 11 wherein the step of removing the pot means with the decorative cover is performed automatically.

16. The method of any one of claims 6, 7, 8, 9, 10 or 11 wherein the step of utilizing the cover forming means is performed automatically.

17. The method of any one of claims 6, 7, 8, 9, 10 or 11 wherein the step of utilizing the cover forming means further comprises moving the pot means and the sheet of material into the cover forming means.

18. The method of any one of claims 6, 7, 8, 9, 10 or 11 wherein the step of removing each pot means is performed automatically.

19. The method of any one of claims 6, 7, 8, 9, 10, or 11 wherein following the step of removing the pot means, each of the previous steps is repeated with a newly provided pot means.

\* \* \* \* \*

UNITED STATES PATENT AND TRADEMARK OFFICE
CERTIFICATE OF CORRECTION

PATENT NO. : 5,481,850
DATED : January 9, 1996
INVENTOR(S) : Weder et al.

It is certified that error appears in the above-identified patent and that said Letters Patent is hereby corrected as shown below:

On the title page,
Page 2, Cited References, OTHER PUBLICATIONS, Exhibit V, line 2, please delete "Big" and substitute therefor --Bag--.

In the drawings, Figure 26, please change reference numeral "292" to --293-- as indicated below.

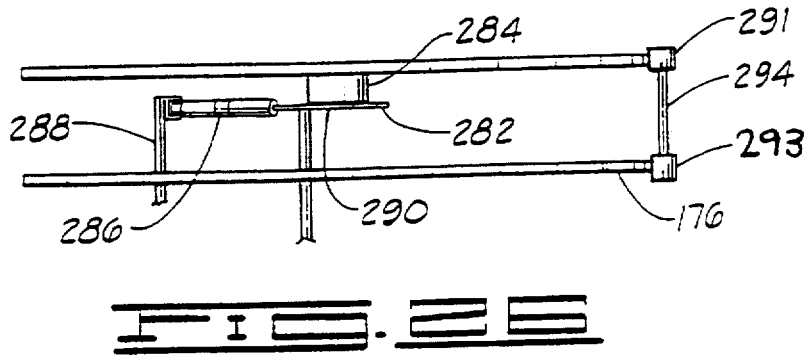

FIG. 26

UNITED STATES PATENT AND TRADEMARK OFFICE
CERTIFICATE OF CORRECTION

PATENT NO. : 5,481,850
DATED : January 9, 1996
INVENTOR(S) : Weder et al.

Page 2 of 6

It is certified that error appears in the above-identified patent and that said Letters Patent is hereby corrected as shown below:

In the drawings, Figure 36, please add reference numeral --330-- as indicated below.

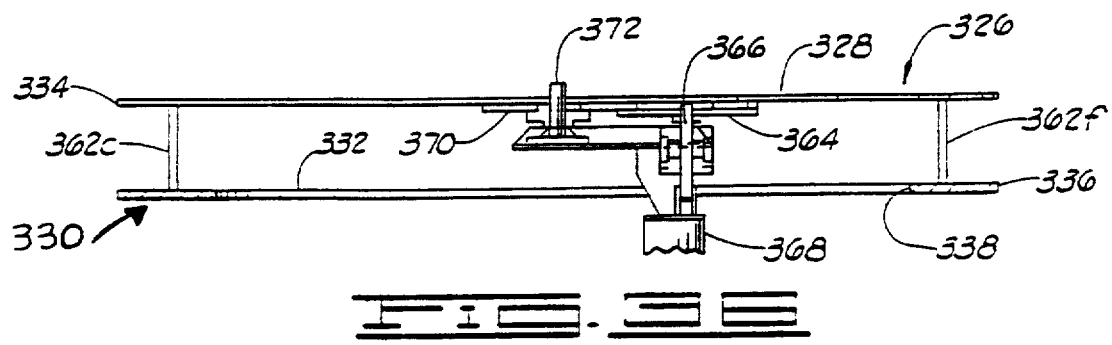

FIG. 36

UNITED STATES PATENT AND TRADEMARK OFFICE
CERTIFICATE OF CORRECTION

PATENT NO. : 5,481,850
DATED : January 9, 1996
INVENTOR(S) : Weder et al.

It is certified that error appears in the above-identified patent and that said Letters Patent is hereby corrected as shown below:

Column 3, line 4, after "of" please delete "a".

Column 4, line 15, before "lower" please insert --the--.

Column 6, line 61, after "single flower" please insert --,--.

Column 7, line 10, please delete "a portion of", second occurrence.

Column 8, line 54, please delete "second sheet of material 20d" and substitute therefor --second sheet of material 26d--.

Column 8, line 59, please delete "second sheet of material 20d" and substitute therefor --second sheet of material 26d--.

Column 9, line 29, please delete "spaces 76. Between" and substitute therefor --spaces 78 between--.

Column 9, line 31, please delete "spaces 76" and substitute therefor --spaces 78--.

Column 10, line 9, please delete "first material 94" and substitute therefor --first material 92--.

Column 12, line 12, please delete "outer peripheral surface 20i" and substitute therefor --outer peripheral surface 144--.

UNITED STATES PATENT AND TRADEMARK OFFICE
CERTIFICATE OF CORRECTION

PATENT NO. : 5,481,850
DATED : January 9, 1996
INVENTOR(S) : Weder et al.

It is certified that error appears in the above-identified patent and that said Letters Patent is hereby corrected as shown below:

Column 12, line 13, please delete "outer peripheral surface 20i" and substitute therefor --outer peripheral surface 144--.

Column 14, line 56, please delete "an" and substitute therefor --and--.

Column 16, line 7, before "support assembly" please insert --upper--.

Column 16, line 14, please delete "opening 184" and substitute therefor --openings 184--.

Column 16, line 34, please delete "222".

Column 16, line 38, please delete "222".

Column 17, line 9, please delete "belt's 250" and substitute therefore --belts 250--.

Column 17, line 36, please delete "A" and substitute therefor --An--.

Column 17, line 56, please delete "174" and substitute therefor --176--.

Column 18, line 19, please delete "lower roller 292" and substitute therefor --lower roller 293--.

Column 18, line 22, please delete "lower roller 292" and substitute therefor --lower roller 293--.

UNITED STATES PATENT AND TRADEMARK OFFICE
CERTIFICATE OF CORRECTION

PATENT NO. : 5,481,850
DATED : January 9, 1996
INVENTOR(S) : Weder et al.

It is certified that error appears in the above-identified patent and that said Letters Patent is hereby corrected as shown below:

Column 18, line 26, please delete "lower roller 292" and substitute therefor --lower roller 293--.

Column 19, line 24, please delete "FIG. 1" and substitute therefor --FIG. 19--.

Column 19, line 53, please delete "FIGS. 31-33" and substitute therefor --FIGS. 31-34--.

Column 20, line 3, please delete "FIG. 1" and substitute therefor --FIG. 19--.

Column 20, line 47, please delete "outer perimeter 336" and substitute therefor --outer perimeter 334--.

Column 21, line 51, please delete "rotary covering apparatus 326" and substitute therefor --rotary covering apparatus 324--.

Column 22, line 2, please delete "rotary covering apparatus 326" and substitute therefor --rotary covering apparatus 324--.

Column 22, line 9, please delete "rotary covering apparatus 326" and substitute therefor --rotary covering apparatus 324--.

UNITED STATES PATENT AND TRADEMARK OFFICE
CERTIFICATE OF CORRECTION

PATENT NO. : 5,481,850
DATED : January 9, 1996
INVENTOR(S) : Weder et al.

It is certified that error appears in the above-indentified patent and that said Letters Patent is hereby corrected as shown below:

Column 24, line 43, please delete "clamp 406" and substitute therefor --clamp head 406--.

Column 24, line 48, after "10" please insert --and--.

Signed and Sealed this

Tenth Day of September, 1996

Attest:

BRUCE LEHMAN

Attesting Officer     Commissioner of Patents and Trademarks